US011215451B2

(12) United States Patent
Critchley et al.

(10) Patent No.: US 11,215,451 B2
(45) Date of Patent: Jan. 4, 2022

(54) TRAILER LENGTH DETECTION SYSTEM

(71) Applicant: Continental Automotive Systems, Inc., Auburn Hills, MI (US)

(72) Inventors: James H Critchley, Lake Orion, MI (US); Nizar Ahamed, Farmington Hills, MI (US); Abdulwahab Alkeilani, Bloomfield Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 337 days.

(21) Appl. No.: 16/135,632

(22) Filed: Sep. 19, 2018

(65) Prior Publication Data

US 2019/0086204 A1 Mar. 21, 2019

Related U.S. Application Data

(60) Provisional application No. 62/560,899, filed on Sep. 20, 2017.

(51) Int. Cl.
*G01B 21/06* (2006.01)
*G05D 1/02* (2020.01)
(Continued)

(52) U.S. Cl.
CPC ............ *G01B 21/06* (2013.01); *B60D 1/245* (2013.01); *B60D 1/30* (2013.01); *B60D 1/62* (2013.01);
(Continued)

(58) Field of Classification Search
CPC ..... G01B 21/06; G01S 17/931; G01S 13/867; G01S 13/88; G01S 13/931; G01S 15/88;
(Continued)

(56) References Cited

U.S. PATENT DOCUMENTS

2006/0071447 A1* 4/2006 Gehring ................... B60T 7/22
280/477
2014/0160275 A1* 6/2014 Sakakibara ............... B60R 1/00
348/118
(Continued)

FOREIGN PATENT DOCUMENTS

DE 201014005681 A 10/2015
DE 201015210816 A 12/2016
(Continued)

OTHER PUBLICATIONS

International Search Report and Written Opinion of the International Searching Authority dated Jan. 30, 2019 for the corresponding PCT application No. PCT/US2018/051884.
(Continued)

*Primary Examiner* — Hunter B Lonsberry
*Assistant Examiner* — Elizabeth Yang

(57) ABSTRACT

A method for determining a length of a trailer attached to a tow vehicle having one or more sensors positioned on a back portion of the tow vehicle facing the trailer is disclosed. The method includes receiving, at a data processing hardware in communication with the one or more sensors, first sensor data associated with a first position of the tow vehicle. The method includes receiving, at the data processing hardware, second sensor data associated with a second position of the tow vehicle. The second position is different from the first position. The method also includes receiving, at the data processing hardware, third sensor data associated with a third position of the tow vehicle. The third position is different from the first position and the second position. The method includes determining, at the data processing hardware, a length of the trailer based on the first, second, and third sensor data.

21 Claims, 18 Drawing Sheets

(51) Int. Cl.

| | |
|---|---|
| *B60W 50/14* | (2020.01) |
| *G05D 1/00* | (2006.01) |
| *G01S 13/88* | (2006.01) |
| *G01S 17/88* | (2006.01) |
| *B62D 15/02* | (2006.01) |
| *B62D 13/06* | (2006.01) |
| *B60D 1/62* | (2006.01) |
| *G01S 15/931* | (2020.01) |
| *B60W 50/00* | (2006.01) |
| *G01S 13/86* | (2006.01) |
| *G01S 15/88* | (2006.01) |
| *B60D 1/24* | (2006.01) |
| *B60D 1/30* | (2006.01) |
| *G01S 13/931* | (2020.01) |
| *G06T 7/60* | (2017.01) |
| *G01S 17/931* | (2020.01) |
| *H04L 29/08* | (2006.01) |
| *G06K 9/00* | (2006.01) |
| *G01S 13/42* | (2006.01) |
| *G01S 15/42* | (2006.01) |
| *G01S 17/42* | (2006.01) |
| *G01S 15/86* | (2020.01) |
| *G01S 17/86* | (2020.01) |

(52) U.S. Cl.
CPC ........ *B60W 50/0098* (2013.01); *B60W 50/14* (2013.01); *B62D 13/06* (2013.01); *B62D 15/0285* (2013.01); *G01S 13/867* (2013.01); *G01S 13/88* (2013.01); *G01S 13/931* (2013.01); *G01S 15/88* (2013.01); *G01S 15/931* (2013.01); *G01S 17/88* (2013.01); *G01S 17/931* (2020.01); *G05D 1/0061* (2013.01); *G05D 1/0212* (2013.01); *G06T 7/60* (2013.01); *B60W 2050/146* (2013.01); *B60W 2520/22* (2013.01); *G01S 13/42* (2013.01); *G01S 15/42* (2013.01); *G01S 15/86* (2020.01); *G01S 17/42* (2013.01); *G01S 17/86* (2020.01); *G01S 2013/932* (2020.01); *G01S 2013/9318* (2020.01); *G01S 2013/9319* (2020.01); *G01S 2013/93185* (2020.01); *G01S 2013/93271* (2020.01); *G01S 2013/93272* (2020.01); *G01S 2015/937* (2013.01); *G05D 2201/0213* (2013.01); *G06K 9/00825* (2013.01); *G06T 2207/10024* (2013.01); *G06T 2207/10028* (2013.01); *G06T 2207/30252* (2013.01); *H04L 67/12* (2013.01)

(58) Field of Classification Search
CPC ...... G01S 15/931; G01S 17/88; G01S 13/932; G01S 15/86; G01S 2013/93185; G01S 2013/9318; G01S 17/86; G01S 2013/93271; G01S 2013/93272; G01S 2013/9319; G01S 13/42; G01S 15/42; G01S 17/42; G01S 2015/937; B60D 1/245; B60D 1/30; B60D 1/62; B60W 50/0098; B60W 50/14; B60W 2050/146; B60W 2520/22; B62D 13/06; B62D 15/0285; G05D 1/0061; G05D 1/0212; G05D 2201/0213; G06T 7/60; G06T 2207/10024; G06T 2207/10028; G06T 2207/30252; G06K 9/00825; H04L 67/12

See application file for complete search history.

(56) References Cited

U.S. PATENT DOCUMENTS

| | | | |
|---|---|---|---|
| 2014/0160276 A1* | 6/2014 | Pliefke | B62D 13/06 348/118 |
| 2014/0188344 A1* | 7/2014 | Lavoie | B62D 15/028 701/41 |
| 2014/0267688 A1* | 9/2014 | Aich | B60W 50/0097 348/113 |
| 2014/0303827 A1* | 10/2014 | Dolgov | B60W 30/00 701/23 |
| 2014/0303849 A1* | 10/2014 | Hafner | B60W 50/14 701/42 |
| 2016/0153778 A1* | 6/2016 | Singh | G01B 21/08 701/36 |
| 2018/0354553 A1* | 12/2018 | Stroebel | B62D 13/06 |
| 2019/0308641 A1* | 10/2019 | Sato | G09G 5/36 |
| 2020/0164920 A1* | 5/2020 | Maruoka | B62D 15/029 |

FOREIGN PATENT DOCUMENTS

| | | |
|---|---|---|
| WO | 2014019730 A1 | 2/2014 |
| WO | 2015001065 A1 | 1/2015 |

OTHER PUBLICATIONS

IP Australia Notice of acceptance for patent application dated Mar. 26, 2021 for the counterpart Australian Patent Application No. 2018336887.

Japanese Notice of Reasons for Refusal dated Mar. 17, 2021 for the counterpart Japanese Patent Application No. 2020-516670.

IP Australia Office Action dated Dec. 2, 2020 for the counterpart Australian Patent Application No. 2018336887.

\* cited by examiner

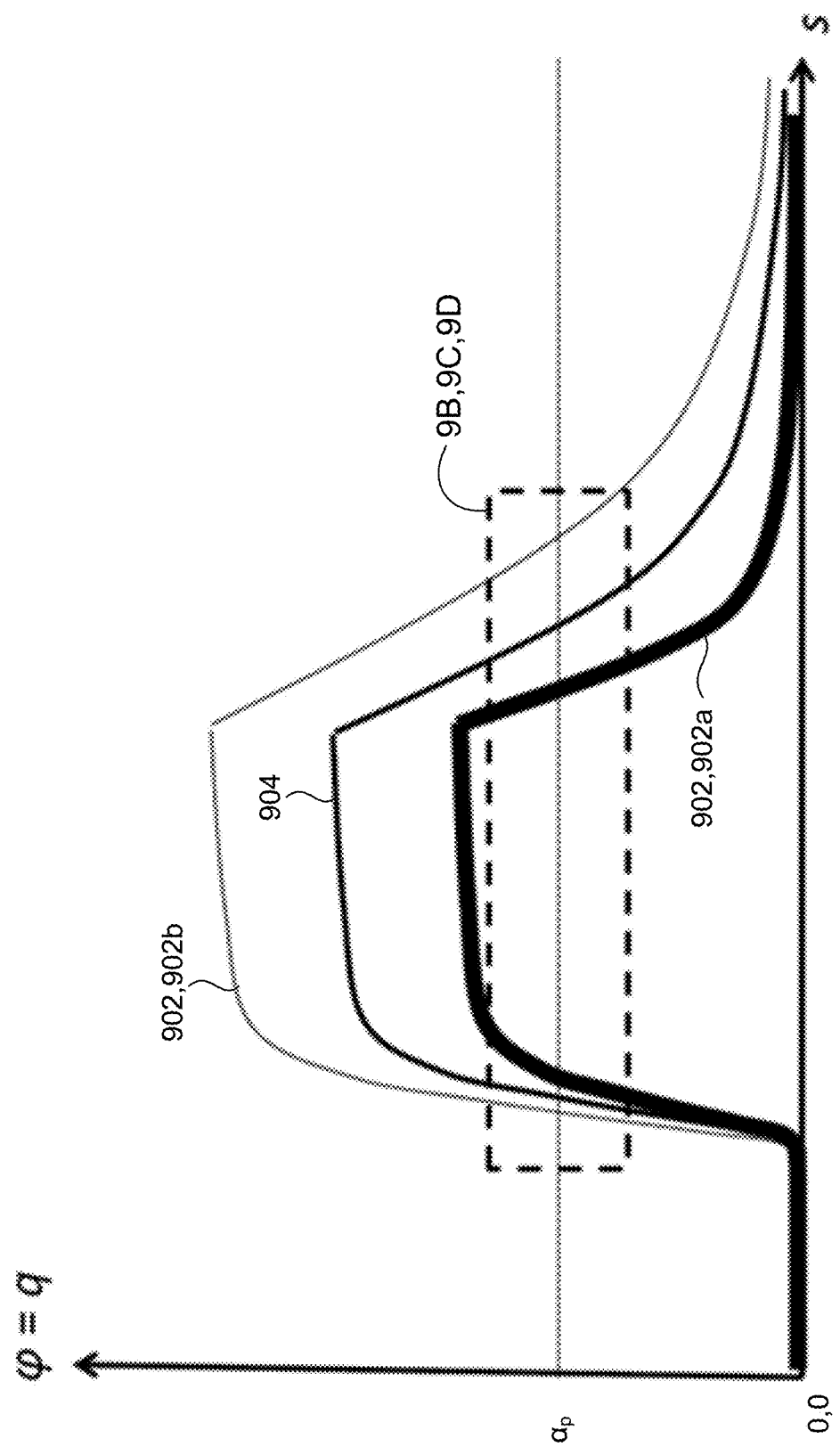

TRAILER LENGTH DETECTION SYSTEM

CROSS REFERENCE TO RELATED APPLICATION

The present application claims the benefit of U.S. provisional application 62/560,899, filed Sep. 20, 2017.

TECHNICAL FIELD

This disclosure relates to a tow vehicle configured to attach to a trailer. The tow vehicle includes a trailer length detection system that detects a length of the trailer.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some example, the trailer is electrically connected to the tow vehicle. As such, the electrical connection allows the trailer to take the feed from the powered vehicle's rear light circuit, allowing the trailer to have taillights, turn signals, and brake lights that are in sync with the powered vehicle's lights.

Some vehicles may be equipped with a trailer assist functionality that aids the driver in maneuvering the trailer while driving backwards. In some examples, the vehicle is equipped with a knob that allows the driver to maneuver the trailer. The knob gives the driver the sensation that he/she is steering an attached trailer directly while backing up rather than steering the vehicle rearwards resulting in pushing the trailer rearwards. As such, a trailer assist functionality gives the driver the intuitive feel when the driver is driving in the rearward direction and turning the knob to one direction, then the trailer turns to the same direction. This results in a simpler and easier way to maneuver the trailer while backing up. When the vehicle is connected to the trailer, the driver usually manually enters the length of the trailer, in addition to several other trailer parameters, allowing the tow vehicle to better maneuver the trailer in both forward and rearward directions and to allow the trailer assist functionality to be activated.

Additionally; a trailer system may require several roadway maneuvers (90 degree turns while driving in the forward direction) to enable the tow vehicle to identify the length of the trailer from observed dynamic characteristics. It may be cumbersome and not practical for the driver to manually enter the length of the trailer and sometimes drive the tow vehicle that is attached to the trailer to identify the length of the trailer. Therefore, it is desirable to have a system that overcomes the manual entry or having to drive for a specific length of time or a specific distance and can determine the length of the trailer.

SUMMARY

One aspect of the disclosure provides a method for determining a trailer length of a trailer attached to a tow vehicle while the tow vehicle follows a path. The tow vehicle has one or more sensors positioned on a back portion of the tow vehicle facing the trailer. The method includes receiving, at a data processing hardware in communication with the one or more sensors, first sensor data associated with a first position of the tow vehicle along the path. The method also includes receiving, at the data processing hardware, second sensor data associated with a second position of the tow vehicle along the path. The second position being different from the first position. The method also includes receiving, at the data processing hardware, third sensor data associated with a third position of the tow vehicle along the path, the third position being different from the first position and the second position. The method also includes determining, at the data processing hardware, a trailer length based on the first, second, and third sensor data. The method also includes transmitting from the data processing hardware to a user interface in communication with the data processing hardware, instructions to display the trailer length.

Implementations of this aspect of the disclosure may include one or more of the following optional features. In some implementations, the method further include, before receiving the second sensor data: determining, at the data processing hardware, a first trailer angle between the tow vehicle and the trailer based on the first sensor data. In addition, when the first trailer angle is not equal to zero, the method includes determining a second trailer angle after the tow vehicle has moved from the first position to the second position. In some examples, a distance between the first position and the second position, and a distance between the second position and the third position are each less than a predetermined distance.

In some implementations, the method includes transmitting, from the data processing hardware to a user interface in communication with the data processing hardware, a command instructing the user interface to display a representation of a manual mode, a representation of a semi-manual mode, and a representation of an autonomous mode. The method also includes receiving, at the data processing hardware from the user interface, a selection of one of the representations of the manual mode, the semi-manual mode, and the autonomous mode. In some examples, the method also includes receiving, at the data processing hardware, the selection of the semi-manual mode. In addition, before receiving the first sensor data associated with the first position of the tow vehicle: the method includes transmitting, from the data processing hardware to the user interface, a command instructing the user interface to display a first maneuver to be taken by a driver of the tow vehicle to move the tow vehicle from an initial position to the first position; and receiving a confirmation from the driver via the user interface, the confirmation indicative of the driver following the first maneuver. The method may also include receiving, at the data processing hardware, the selection of the autonomous mode and receiving, at the data processing hardware, sensor data associated with sensors positioned on a front portion and side portions of the tow vehicle. Additionally, the method may include determining, at the data processing hardware, a vehicle path having one or more maneuvers that include positioning the tow vehicle at the first, second, and third positions; and instructing a drive system in communication with the data processing hardware to follow the vehicle path.

Another aspect of the disclosure provides a method for determining a length of a trailer attached to a tow vehicle. The tow vehicle having one or more sensors positioned on a back portion of the tow vehicle facing the trailer. The method includes receiving, at a data processing hardware in communication with the one or more sensors, first sensor data associated with a first position of the tow vehicle. The method also includes determining, by the data processing hardware, a trailer angle between the tow vehicle and the trailer based on the first sensor data. When the trailer angle is not equal to zero, the method includes receiving, at the data processing hardware, second sensor data associated with a second position of the tow vehicle after the tow vehicle has moved along a straight path for a first threshold distance, and determining, by the data processing hardware, the trailer angle based on the second sensor data. When the trailer angle is equal to zero, the method includes receiving, at the data processing hardware, third sensor data associated with a third position after the tow vehicle has moved in a first direction for a second threshold distance. The method also includes receiving, at the data processing hardware, fourth sensor data associated with a fourth position after the tow vehicle has moved in a second direction being different from the first direction; and determining, at the data processing hardware, the length of the trailer based on the first sensor data, the second sensor data, and the third sensor data. The method also includes transmitting from the data processing hardware to a user interface in communication with the data processing hardware, instructions to display the trailer length.

Implementations of the disclosure may include one or more of the following optional features. In some implementations, the first threshold distance and the second threshold distance are less than a predetermined distance. In some examples, the method includes transmitting, from the data processing hardware to a user interface in communication with the data processing hardware, a command instructing the user interface to display a representation of a manual mode, a semi-manual mode, and an autonomous mode. Additionally; the method may include receiving, at the user interface, a selection of the representation of one of the manual mode, the semi-manual mode, and the autonomous mode. In some examples, the method includes receiving, at the data processing hardware, the selection of the semi-manual mode. Before receiving the first sensor data associated with the first position of the tow vehicle, the method may include: transmitting, from the data processing hardware to the user interface, a command instructing the user interface to display a first maneuver to be taken by a driver of the tow vehicle to move the tow vehicle from an initial position to the first position; and receiving, at the data processing hardware, a confirmation from the driver via the user interface. The confirmation is indicative of the driver following the first maneuver.

In some implementations, the method further includes: receiving, at the data processing hardware, the selection of the autonomous mode; and receiving, at the data processing hardware, sensor data associated with sensors positioned on a front portion and side portions of the tow vehicle. The method may also include: determining, at the data processing hardware, a vehicle path that has one or more maneuvers that include the first, second, and third positions; and instructing a drive system in communication with the data processing hardware to follow the vehicle path.

Yet another aspect of the disclosure provides a method for determining a trailer length of a trailer attached to a tow vehicle. The tow vehicle has one or more sensors positioned on a back portion of the tow vehicle facing the trailer. The tow vehicle executes maneuvers causing and trailer to move. The method includes receiving, at a data processing hardware in communication with the one or more sensors, one or more images of a rear environment of the tow vehicle including a trailer representation associated with the trailer. The method includes overlaying, at the data processing hardware, one or more virtual trailers on the one or more images, the one or more virtual trailers having a width and a height equaling a trailer width and a trailer height associated with the trailer. For each one of the one or more virtual trailers, the method includes storing, at hardware memory in communication with the data processing hardware, a first time when the virtual trailer reaches a predetermined trailer angle. The predetermined trailer angle is indicative of an angle between the trailer and the tow vehicle. The method also includes, for each one of the one or more virtual trailers: storing, at the hardware memory, a trailer representation position of the trailer representation within the one or more images at the first time; storing, at the hardware memory, a second time when the virtual trailer reaches the predetermined trailer angle; and storing, at the hardware memory, a third time when the trailer representations reaches the trailer representation position. The method also includes determining, at the data processing hardware, the trailer length of the trailer based on the first time, second time, third time for each one of the one or more virtual trailers; and transmitting from the data processing hardware to a user interface in communication with the data processing hardware, instructions to display the trailer length.

Implementations of this aspect of the disclosure may include one or more of the following optional features. In some implementations, for each one of the one or more virtual trailers, the method includes: determining, at the data processing hardware, a first difference between the first time and the second time; determining, at the data processing hardware, a second difference between the first time and the third time; and determining, at the data processing hardware, a third difference between the first different and the second difference. Additionally, the method may include determining, at the data processing hardware, the trailer length of the trailer based on the third difference associated with each one of the one or more virtual trailers.

In some implementations, determining the trailer length of the trailer based on the third difference includes interpolating values of between each one of the third difference associated with the one or more virtual trailers. The predetermined trailer angle may be, but is not limited to 10 degrees.

In some examples, the method includes transmitting, from the data processing hardware to a user interface in communication with the data processing hardware, a command instructing the user interface to display a representation of a manual mode, a representation of a semi-manual mode, and a representation of an autonomous mode. The method may also include receiving, at the data processing hardware from the user interface, a selection of one of the representations of the manual mode, the semi-manual mode, and the autonomous mode. In some implementations, the method also includes: receiving, at the data processing hardware, the selection of the semi-manual mode; transmitting, from the data processing hardware to the user interface, a command instructing the user interface to display a first maneuver to be taken by a driver of the tow vehicle to move the tow vehicle; and receiving, at the data processing hardware, a confirmation from the driver via the user interface, the confirmation indicative of the driver following the first maneuver. In some examples, the method includes: receiving, at the data processing hardware, the selection of the autonomous mode; determining, at the data processing hardware, a vehicle path comprising one or more maneuvers; and instructing a drive system in communication with the data processing hardware to follow the vehicle path.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 9A-9D is a schematic view of an exemplary graph illustrating the progress of the vehicle representation and the two virtual trailers as the vehicle and trailer move drive in real time.

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. It is desirable to have a tow vehicle that is capable of detecting a length of the trailer without having the driver manually enter the length of the trailer. In addition, it is desirable that the tow vehicle is capable of determining the trailer length by executing short maneuvers in a parking lot for example, without the need to drive in a forward direction for a long distance. For example, the trailer length may be determined by driving in a rearward direction only, or a combination of rearward and forward motions. As such, the driver can connect to any trailer and the tow vehicle can detect the length of the trailer.

Figure 1A:
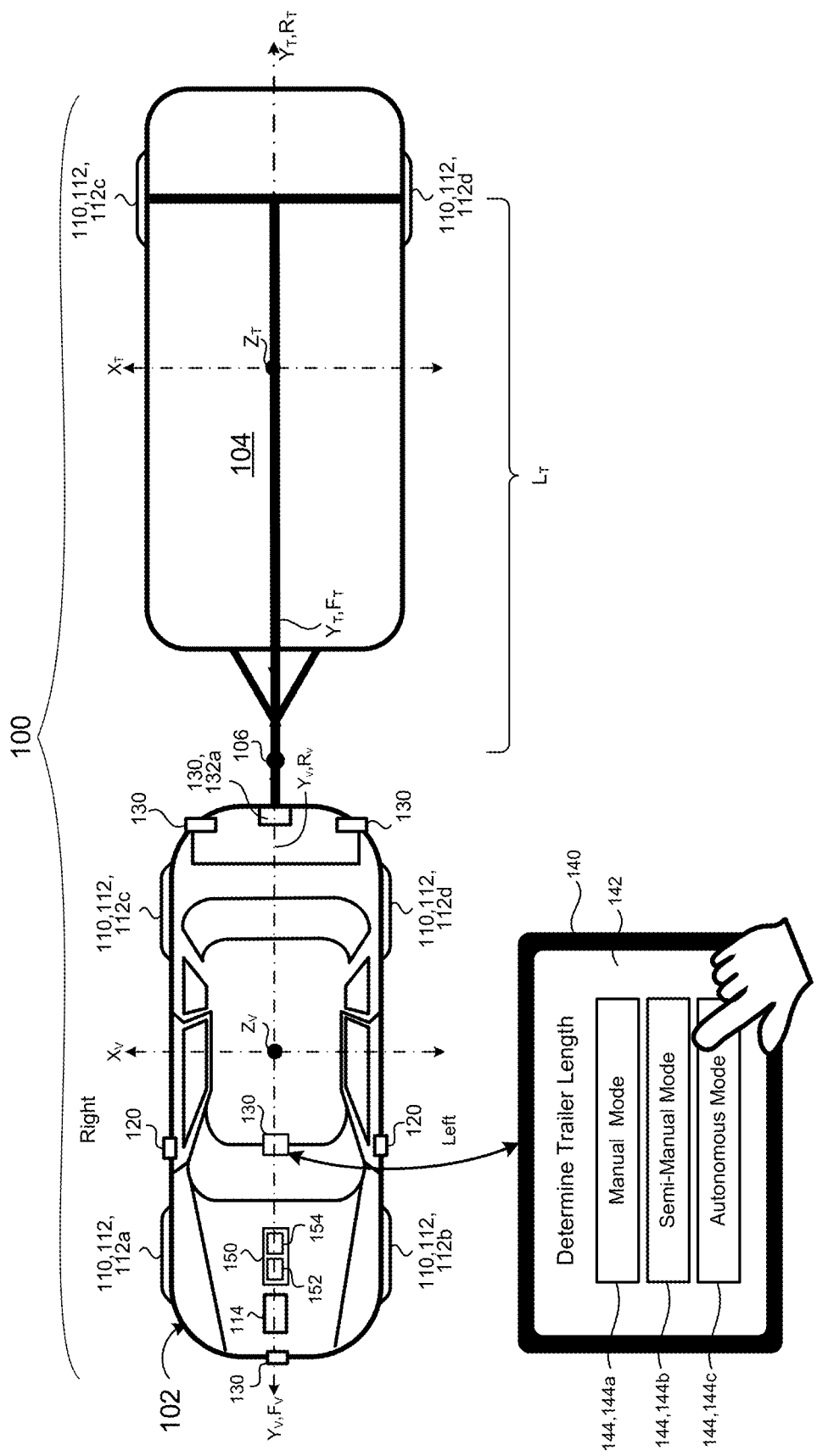
FIG. 1A is a perspective view of an exemplary tow vehicle hitched to a trailer.
Figure 1B:
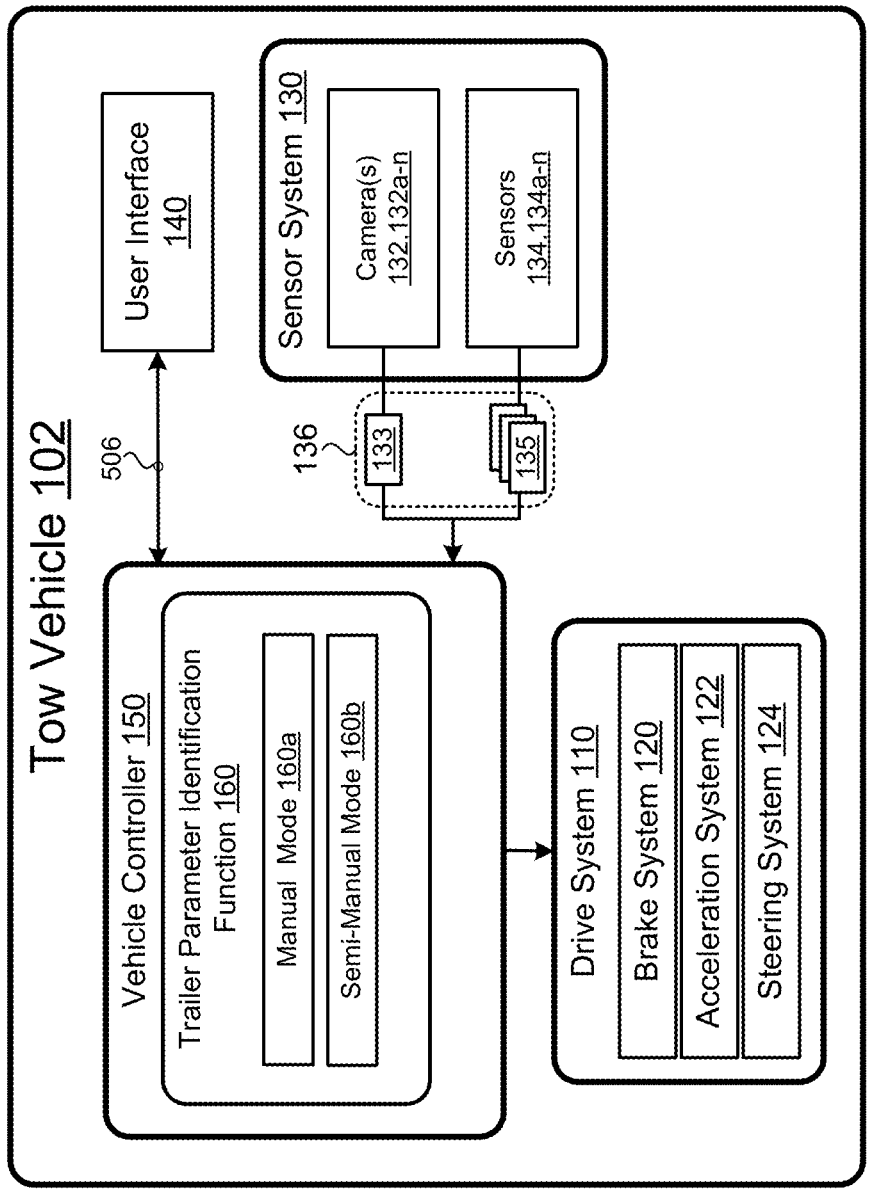
FIG. 1B is a schematic view of an exemplary tow vehicle having a trailer length detection system.

Referring to FIGS. 1A and 1B, in some implementations, a vehicle-trailer system 100 includes a tow vehicle 102 hitched to a trailer 104 by way of a hitch 106. The tow vehicle 102 includes a drive system 110 associated with the tow vehicle 102 that maneuvers the tow vehicle 102 and thus the vehicle-trailer system 100 across a road surface based on drive maneuvers or commands having x, y, and z components, for example. As shown, the drive system 110 includes a front right wheel 112, 112a, a front left wheel 112, 112b, a rear right wheel 112, 112c, and a rear left wheel 112, 112d. In addition, the drive system 110 may include wheels (not shown) associated with the trailer 104. The drive system 110 may include other wheel configurations as well. The drive system 110 may include a motor or an engine 114 that converts one form of energy into mechanical energy allowing the vehicle 102 to move. The drive system 110 includes other components (not shown) that are in communication with and connected to the wheels 112 and engine 114 and that allow the vehicle 102 to move, thus moving the trailer 104 as well. The drive system 110 may also include a brake system 120 that includes brakes (not shown) associated with each wheel 112, 112a-d, where each brake is associated with a wheel 112a-d and is configured to slow down or stop the wheel 112a-n from rotating. In some examples, the brake system 120 is connected to one or more brakes supported by the trailer 104. The drive system 110 may also include an acceleration system 122 that is configured to adjust a speed of the tow vehicle 102 and thus the vehicle-trailer system 100, and a steering system 124 that is configured to adjust a direction of the tow vehicle 102 and thus the vehicle-trailer system 100. The vehicle-trailer system 100 may include other systems as well.

The tow vehicle 102 may move across the road surface by various combinations of movements relative to three mutually perpendicular axes defined by the tow vehicle 102: a transverse axis $X_V$, a fore-aft axis $Y_V$, and a central vertical axis $Z_V$. The transverse axis $X_V$, extends between a right side R and a left side of the tow vehicle 102. A forward drive direction along the fore-aft axis $Y_V$ is designated as $F_V$, also referred to as a forward motion. In addition, an aft or rearward drive direction along the fore-aft direction $Y_V$ is designated as $R_V$, also referred to as rearward motion. In some examples, the tow vehicle 102 includes a suspension system (not shown), which when adjusted causes the tow vehicle 102 to tilt about the $X_V$ axis and or the $Y_V$ axis, or move along the central vertical axis $Z_V$. As the tow vehicle 102 moves, the trailer 104 follows along a path of the tow vehicle 102. Therefore, when the tow vehicle 102 makes a turn as it moves in the forward direction $F_V$, then the trailer 104 follows along. While turning, the tow vehicle 102 and the trailer 104 form a trailer angle φ (FIG. 2B).

Moreover, the trailer 104 follows the tow vehicle 102 across the road surface by various combinations of movements relative to three mutually perpendicular axes defined by the trailer 104: a trailer transverse axis $X_T$, a trailer fore-aft axis $Y_T$, and a trailer central vertical axis $Z_T$. The trailer transverse axis $X_T$, extends between a right side R and a left side of the trailer 104. A forward drive direction along the trailer fore-aft axis $Y_T$ is designated as $F_T$, also referred to as a forward motion. In addition, a trailer aft or rearward drive direction along the fore-aft direction $Y_T$ is designated as $R_T$, also referred to as rearward motion. Therefore, movement of the vehicle-trailer system 100 includes movement of the tow vehicle 102 along its transverse axis $X_V$, fore-aft axis $Y_V$, and central vertical axis $Z_V$, and movement of the trailer 104 along its trailer transverse axis $X_T$, trailer fore-aft axis $Y_T$, and trailer central vertical axis $Z_T$. Therefore, when the tow vehicle 102 makes a turn as it moves in the forward direction $F_V$, then the trailer 104 follows along. While turning, the tow vehicle 102 and the trailer 104 form the trailer angle φ (FIG. 2B) being an angle between the vehicle fore-aft axis $Y_V$ and the trailer fore-aft axis $Y_T$.

In some implementations, the vehicle 102 includes a sensor system 130 to provide sensor data 136 that may be used to determine one or more measurements, such as, a trailer length $L_T$. In some examples, the vehicle 102 may be autonomous or semi-autonomous, therefore, the sensor system 130 provides reliable and robust autonomous driving. The sensor system 130 provides sensor data 136 and may include different types of sensors that may be used separately or with one another to create a perception of the tow vehicle's environment or a portion thereof that is used by the vehicle-trailer system 100 to identify object(s) in its environment and/or in some examples autonomously drive and make intelligent decisions based on objects and obstacles detected by the sensor system 130. In some examples, the sensor system 130 is supported by the rear portion of the tow vehicle 102 and provides sensor data 136 associated with object(s) and the trailer 104 positioned behind the tow vehicle 102. The tow vehicle 102 may support the sensor system 130; while in other examples, the sensor system 130 is supported by the vehicle 102 and the trailer 104. The sensor system 130 may include, but not limited to, one or more imaging devices 132, 132a-n (such as camera(s)), and sensors 134, 134a-n such as, but not limited to, radar, sonar, LIDAR (Light Detection and Ranging, which can entail optical remote sensing that measures properties of scattered light to find range and/or other information of a distant target), LADAR (Laser Detection and Ranging), etc. The sensor system 130 provides sensor data 136 that include one or both of sensor images 133 from the one or more cameras 132, 132a-n and sensor information 135 from the one or more sensors 134, 134a-n. Therefore, the sensor system 130 is especially useful for receiving information of the environment or portion of the environment of the vehicle and for increasing safety in the vehicle-trailer system 100 which may operate under semi-autonomous or autonomous conditions.

The tow vehicle 102 may include a user interface 140, such as a display. The user interface 140 is configured to display information to the driver. In some examples, the user interface 140 is configured to receive one or more user commands from the driver via one or more input mechanisms or a touch screen display 142 and/or displays one or more notifications to the driver. In some examples, the user interface 140 is a touch screen display 142; as such, the driver may point his finger and select a representation 144 of an action to be performed as shown in FIG. 1A. In other examples, the user interface 140 is not a touchscreen and the driver may use an input device, such as, but not limited to, a rotary knob or a mouse to select the representation 144 of an action to be performed.

The user interface 140 is in communication with a vehicle controller 150 that includes a computing device (or data processing hardware) 152 (e.g., central processing unit having one or more computing processors) in communication with non-transitory memory or hardware memory 154 (e.g., a hard disk, flash memory, random-access memory) capable of storing instructions executable on the computing processor(s)). In some example, the non-transitory memory 154 stores instructions that when executed on the computing device 152 cause the vehicle controller 150 to provide a signal or command 174 to the drive system 110, which leads to a change of a feature of the vehicle 102. As shown, the vehicle controller 150 is supported by the tow vehicle 102; however, the vehicle controller 150 may be separate from the tow vehicle 102 and in communication with the tow vehicle 102 via a network (not shown). In addition, the vehicle controller 150 is in communication with the sensor system 130, and receives sensor data 136 from the sensor system 130. In some implementations, the vehicle controller 150 is configured to process sensor data 136 received from the sensor system 130.

Figure 1C:
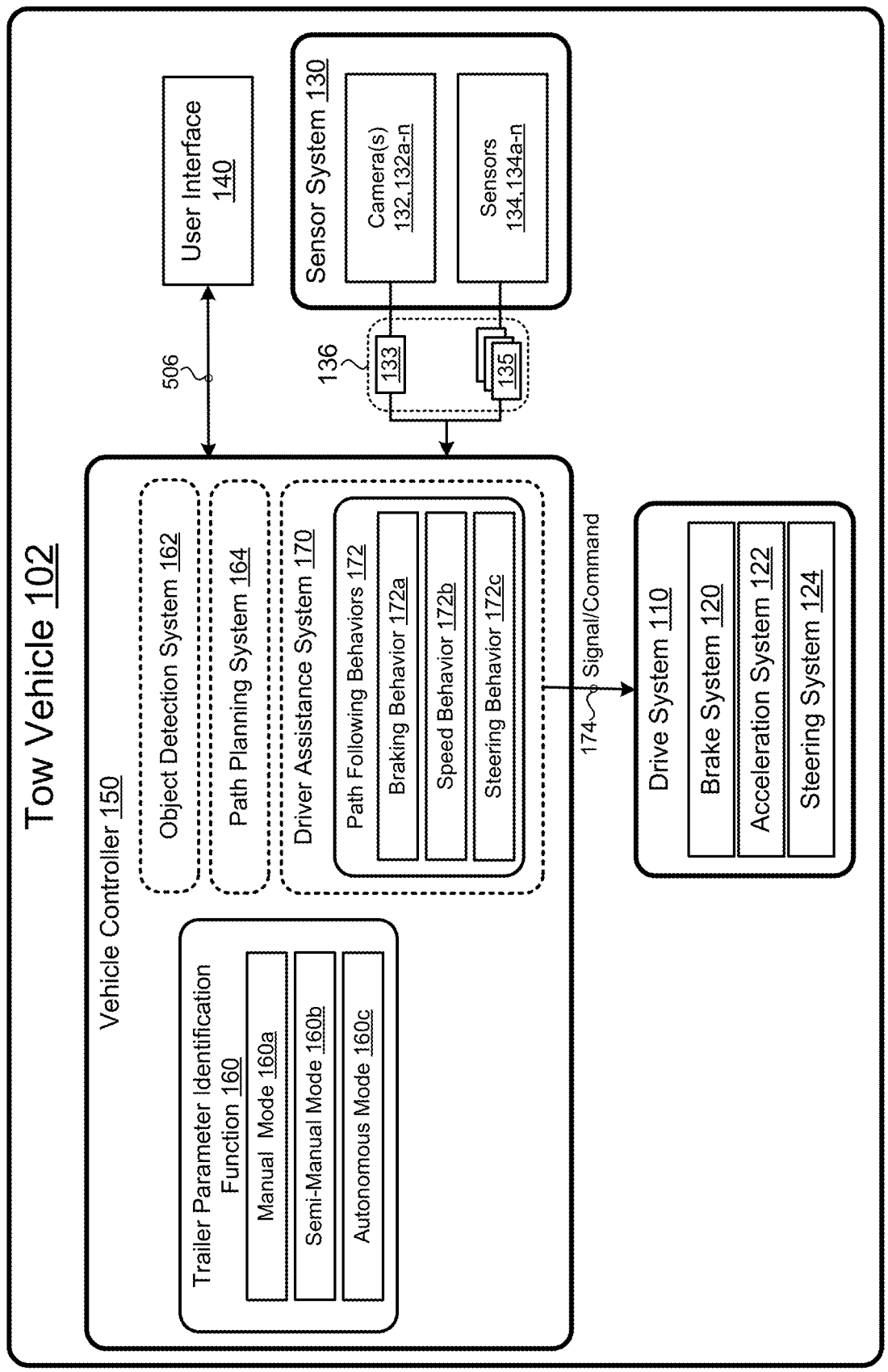
FIG. 1C is a schematic view of an exemplary tow vehicle configured to autonomously drive along a path for determining a length of an attached trailer.

In some implementations, the vehicle controller 150 executes a trailer parameter identification function 160 configured to determine a length $L_T$ of the trailer 104 that is hitched to the tow vehicle 102. The length $L_T$ of the trailer 104 is the distance between the hitch point 106 and the rear axle of the trailer 104. While attached to the trailer 104, the tow vehicle 102 follows a path having predefined maneuvers that allow the trailer parameter identification function 160 to determine the length $L_T$ of the trailer 104. The trailer parameter identification function 160 receives sensor data 136 from the sensors 135, 134 of the sensor system 130 that are positioned on the rear side of the tow vehicle 102 while the vehicle-trailer system 100 is moving along the path that includes the predefined maneuvers (FIGS. 2A-2D and FIGS. 3A-3E). Based on the received sensor data 136, the trailer parameter identification function 160 determines the length $L_T$ of the trailer 104. The trailer parameter identification function 160 may function in a manual mode 160a, a semi-manual mode 160b, or an autonomous mode 160c (FIG. 1C). In some examples, the tow vehicle 102 may be configured to function in only one of the manual mode 160a, a semi-manual mode 160b, or an autonomous mode 160c. While in other examples, the driver selects which 160a-160c he/she wants the trailer parameter identification function 160 to execute. FIG. 1B, shows the trailer parameter identification function 160 configured to execute a manual mode 160a and/or a semi-manual mode 160b. While FIG. 1C includes the autonomous mode 160c.

During the manual mode 160a, the driver follows instructions that include the predetermined maneuvers (FIGS. 2A-2D or 3A-3D), which leads to the tow vehicle 102 driving along the path. While driving, the trailer parameter identification function 160 receives the sensor data 136 from the sensors 135, 134 positioned on the rear side of the tow vehicle 102 and determines the length $L_T$ of the trailer 104 based on the received sensor data 136. In some examples, the trailer parameter identification function 160 receives the sensor data 136, while the driver is executing a maneuver, for example, while the driver is tuning left. In other examples, the trailer parameter identification function 160 continuously receives the sensor data 136. The instructions to the driver may be displayed on the user interface 140 or may be provided in a driver manual, for example.

The semi-manual mode 160b provides the driver with the predefined maneuvers by way of the user interface 140 to follow the path shown in FIGS. 2A-2D or 3A-3D, and after each maneuver, the driver has to confirm that he/she executed the maneuver. While the driver is following the predefined maneuvers, the trailer parameter identification function 160 receives sensor data 136 from the sensors 135, 134 positioned on the rear side of the tow vehicle 102, which allows the trailer parameter identification function 160 to determine the length $L_T$ of the trailer 104. During the semi-manual mode 160b the driver interacts with the user interface 140 by acknowledging that he/she completed a predefined maneuver. Once the driver completes all predefined maneuvers, the trailer parameter identification function 160 determines the length $L_T$ of the trailer.

A driver may initiate the autonomous mode 160c by making a selection of the autonomous mode representations 144c displayed on the user interface 140. Once the selection of the autonomous mode representations 144c is made, the tow vehicle 102 autonomously drives along the predetermined maneuvers, while attached to the trailer 104. In this case, the vehicle controller 150 receives sensor data 136 from the sensors 132, 134 positioned on the rear side of the tow vehicle 102 for determining the length $L_T$ of the trailer 104 and from sensors 132, 134 positioned around the tow vehicle 102 and or the vehicle-trailer system 100, such as on the sides of the vehicle 102 and/or trailer 104, in front of the vehicle 102, and on the back of the trailer 104 for identifying objects along the predetermined path to avoid the identified objects. Therefore, during the autonomous mode 160d, the trailer parameter identification function 160 relies on the sensor data 136 received from the sensors 132, 134 positioned behind the tow vehicle 102 to determine the length $L_T$ of the trailer 104, and relies on all other sensors 132, 134 to provide autonomous driving along the path that includes the predetermined maneuvers.

Referring to FIG. 1C, in some implementations, during the autonomous mode 160c, the vehicle controller 150 executes the object detection system 162. The object detection system 162 receives sensor data 136 from the sensor system 130 having cameras 132 and/or sensors 134 positioned around the tow vehicle 102. The object detection system 162 processes the received sensor data 136 and identifies one or more objects within the environment of the tow vehicle 102. In some examples, the object detection system 162 may also receive sensor data from the trailer 104 and identify one or more objects within an environment of the trailer 104.

With continued reference to FIG. 1C, the vehicle controller 150 executes a path planning system 164 that plans a path including the predetermined maneuvers that allow the trailer parameter identification function 160 to determine the length $L_T$ of the trailer 104. The path planning system 164 may include maneuvering the tow vehicle 102 in a forward direction $F_V$, a rearward direction $R_V$, or a combination thereof. Therefore, the path may include maneuvering the vehicle-trailer system 100 in a forward direction $F_V$, $F_T$, a rearward direction $R_V$, $R_T$, or a combination thereof.

As the vehicle-trailer system 100 is autonomously maneuvering along the planned path, the path planning system 164 continuously updates the path based on continuously receiving sensor data 136 from the sensor system 130. In some examples, the object detection system 162 identifies one or more objects along the planned path and sends the path planning system 164 data relating to the position of the one or more objects. In this case, the path planning system 164 recalculates the planned path to avoid one or more objects. In some examples, the path planning system 164 determines a probability of collision and if the probability of collision exceeds a predetermined threshold, the path planning system 164 adjusts the path and sends it to a driver assistance system 170.

Once the path planning system 164 determines the planned path, then the vehicle controller 150 executes the driver assistance system 170, which in turn includes path following behaviors 172. The path following behaviors 172 receive the planned path and executes one or more behaviors 172a-172ce that send commands 174 to the drive system 110, causing the vehicle 102 to autonomously drive along the planned path, which causes the vehicle-trailer system 100 to autonomously drive along the planned path.

The path following behaviors 172 may include one or more behaviors, such as, but not limited to, a braking behavior 172a, a speed behavior 172b, and a steering behavior 172c. Each behavior 172a-c causes the vehicle 102, and thus the vehicle-trailer system 100 to take an action, such as driving forward or backward, turning at a specific angle, breaking, speeding, slowing down, among others. The vehicle controller 150 may maneuver the vehicle-trailer system 100 in any direction across the road surface by controlling the drive system 110, more specifically by issuing commands 174 to the drive system 110.

The braking behavior 172a may be executed to either stop the vehicle-trailer system 100 or to reduce the speed of the vehicle-trailer system 100 based on the planned path. The braking behavior 172a sends a signal or command 174 to the drive system 110, e g., the brake system (not shown), to either stop the vehicle-trailer system 100 or reduce the speed of the vehicle-trailer system 100. As previously mentioned, the brake system 120 of the tow vehicle 102 may be in communication with a brake system (not shown) of the trailer 104. Therefore, the braking behavior 172a may cause the brakes of the tow vehicle 102 and the brakes of the trailer 104 to reduce the speed or stop the vehicle-trailer system 100.

The speed behavior 172b may be executed to change the speed of the vehicle-trailer system 100 by either accelerating or decelerating based on the planned path. The speed behavior 172b sends a signal or command 174 to the brake system 120 for decelerating or the acceleration system 122 for accelerating.

The steering behavior 172c may be executed to change the direction of the vehicle-trailer system 100 based on the planned path. As such, the steering behavior 172c sends the acceleration system 122 a signal or command 174 indicative of an angle of steering causing the drive system 110 to change direction.

Therefore, as described with reference to FIGS. 1A-1C, the trailer parameter identification function 160 may determine the length $L_T$ of the trailer 104 in one of three modes: a manual mode 160a, a semi-manual mode 160b, and an autonomous mode 160c. Regardless of the mode 160a-160c, the trailer parameter identification function 160 follows a planned path that includes predefined maneuvers. Sensors 132, 134 of the sensor system 130 positioned on the rear side of the tow vehicle 102 capture sensor data 136 and send the sensor data 136 to the trailer parameter identification function 160 allowing the trailer parameter identification function 160 to determine the length $L_T$ of the trailer 104.

Referring to FIGS. 2A-2D, in some implementations, the trailer parameter identification function 160 receives sensor data 136 as the tow vehicle 102 and the trailer 104 are moving along the path that includes the predefined maneuvers. In some examples, the trailer identification function 160 stores the received sensor data in the hardware memory 154 of the vehicle controller 150, and once the trailer parameter identification function 160 has received the sensor data 136 associated with each of the predefined maneuvers, then the trailer parameter identification function 160 determines the trailer length $L_T$. For example, the trailer parameter identification function 160 receives first sensor data 136 associated with a first maneuver, second sensor data 136 associated with a second maneuver, and third sensor data 136 associated with a third maneuver. Additional maneuvers may also be needed.

Figure 2A:
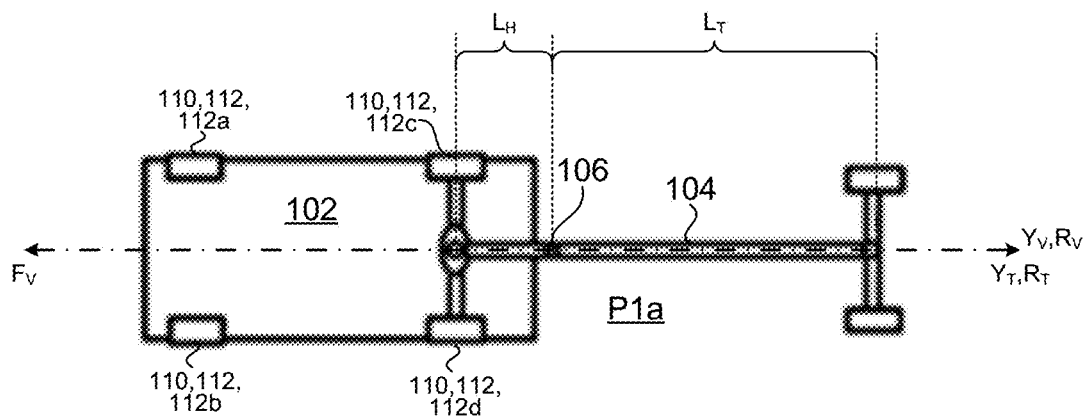
FIGS. 2A-2D are perspective views of an exemplary tow vehicle along a first predetermined path for determining a length of an attached trailer.
Figure 2B:
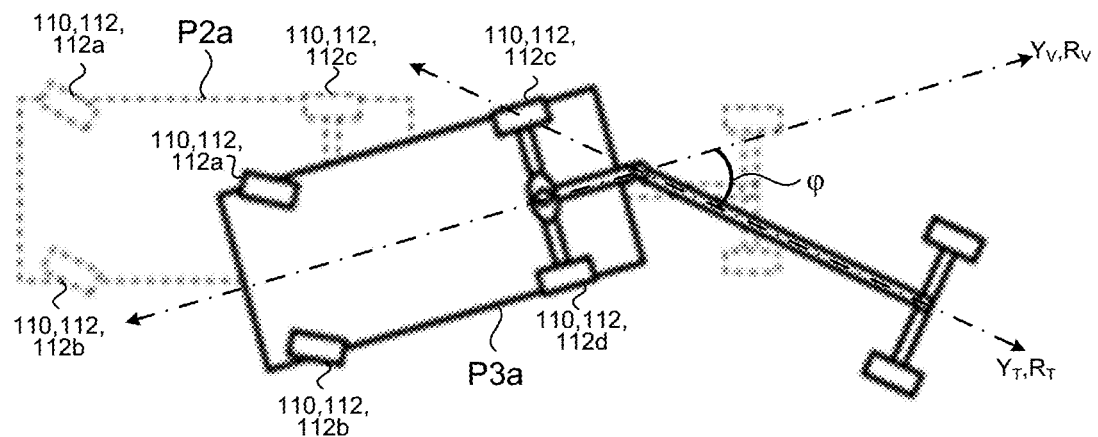

In some implementations, the first vehicle maneuver is a straight line maneuver P1a shown in FIG. 2A where the vehicle-trailer system 100 drives in a forward direction $F_V$ until the trailer angle φ is equal to zero, i.e., the tow vehicle 102 and the trailer 104 are aligned in a straight line, in other words, the fore-aft axis $Y_V$ of the tow vehicle 102 is parallel and aligned with the fore-aft axis $Y_T$ of the trailer 104. In this case, the vehicle controller 150 may optionally confirm the straight line position by pulling forward a short distance to verify that the trailer angle φ equals to zero. This short forward maneuver P1a may also be used to distinguish trailer features from the environment.

Referring to FIG. 2B, once the trailer angle (p is equal to zero, then the tow vehicle 102 performs a second maneuver that includes turning its wheels 112 (front and/or rear wheels may be used to steer), more specifically its front wheels 112a, 112b to the left or the right as shown at position P2a. The third maneuver includes the tow vehicle 102 moving in the rearward direction $R_V$ causing the trailer 104 to also move in the rearward direction $R_T$, as shown at position P3a. The movement of the tow vehicle 102 and thus the trailer 104 in the rearwards direction $R_V$, $R_T$ causes the trailer angle φ to change to a non-zero angle.

Figure 2C:
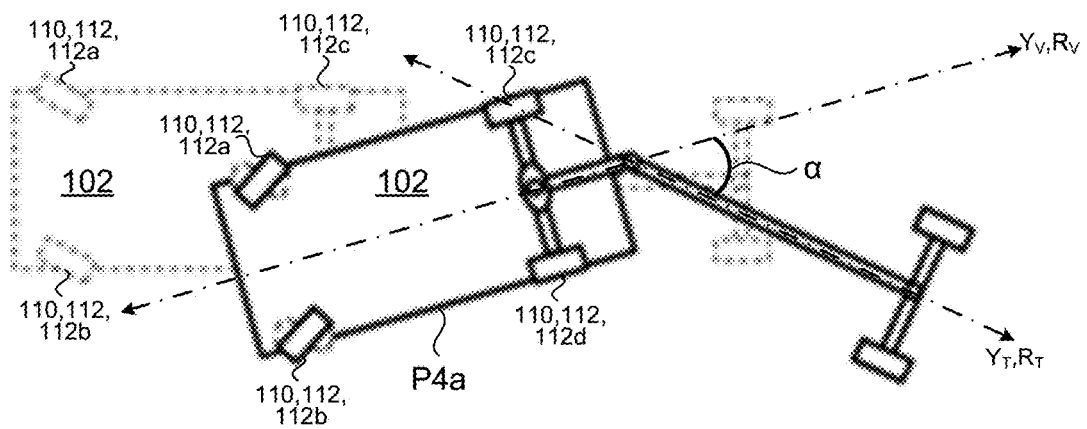
Figure 2D:
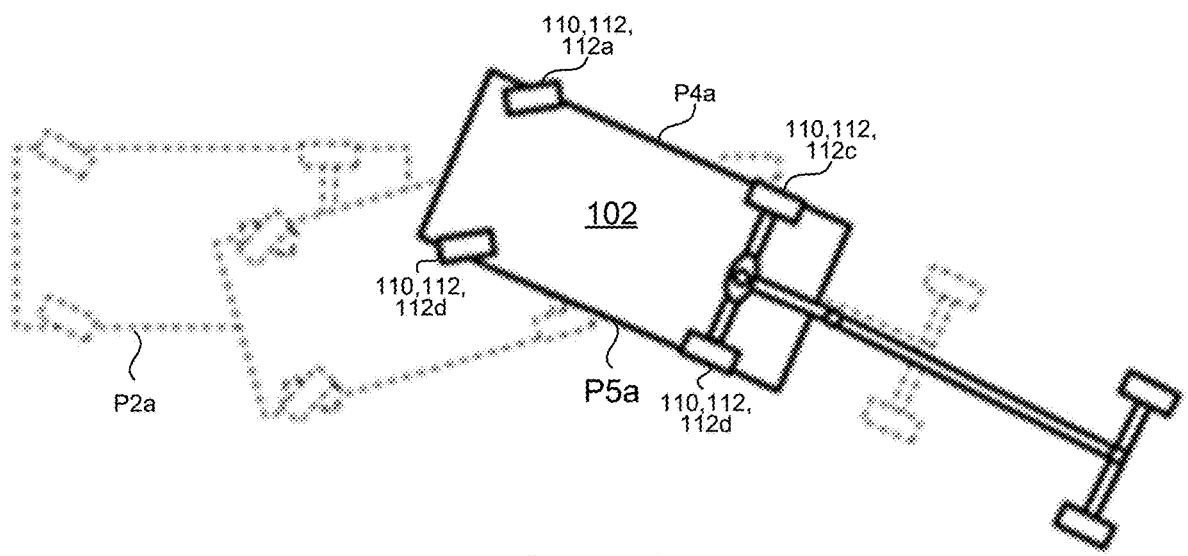

Referring to FIG. 2C, once the vehicle controller 150 detects the orientation change, i.e., the trailer angle φ being non-zero, the front wheels 112a, 112b of the tow vehicle 102 are turned in an opposite direction as shown in position P4a (third maneuver). For example, if the front wheels 112a, 112b were turned to the right in FIG. 2B, then the front wheels 112a, 112b are turned to the left in FIG. 2C. In addition, if the front wheels 112a, 112b were turned to the left in FIG. 2B, then the front wheels 112a, 112b are turned to the right in FIG. 2C. Moreover, once the front wheels 112a, 112b are turned in the opposite direction, the tow vehicle 102 continues its movement in the rearwards direction $R_V$ until the trailer reaches a reference position at P5a shown in FIG. 2D (fourth maneuver). In some examples, the reference position is when the trailer angle φ is equal to zero as shown in FIG. 2D. The vehicle 102 may additionally move in a sequence of short forward maneuvers or forward maneuvers followed by short reverse maneuvers to ensure that the vehicle controller 150 collects enough data points for the trailer parameter identification function 160 to determine the length $L_T$ of the trailer 104. In some implementations, the distance between each position after a maneuver is less than a predetermined distance, thus keeping the total maneuvers to a total of a short drive. Therefore, although only four maneuvers are described above, additional maneuvers may be possible to collect enough data points to determine the length $L_T$ of the trailer 104.

Figure 3A:
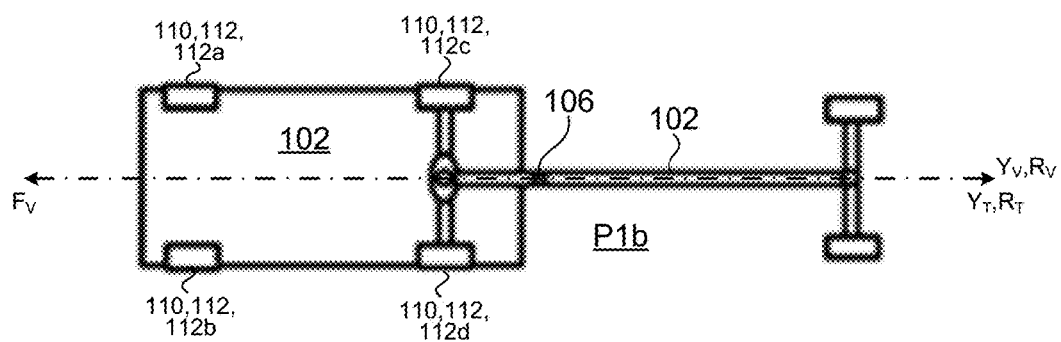
FIGS. 3A-3E are perspective views of an exemplary tow vehicle along a second predetermined path for determining a length of an attached trailer.

FIGS. 3A-3D illustrate a different set of maneuvers that the tow vehicle 102 may follow that allows the trailer parameter identification function 160 to determine the length $L_T$ of the trailer 104. Referring to FIG. 3A, the first vehicle maneuver is a straight line maneuver where the vehicle-trailer system 100 drives in a forward F direction until the trailer angle φ is equal to zero as shown at position P1b, i.e., the tow vehicle 102 and the trailer 104 are aligned in a straight line, in other words, the fore-aft axis $Y_V$ of the tow vehicle 102 is parallel and aligned with the fore-aft axis $Y_T$ of the trailer 104. Similar to FIG. 2A, the vehicle controller 150 may optionally confirm the straight line position by pulling forward a short distance to verify that the trailer angle φ equals to zero. This short forward maneuver P1a may also be used to distinguish trailer features from the environment.

Figure 3B:
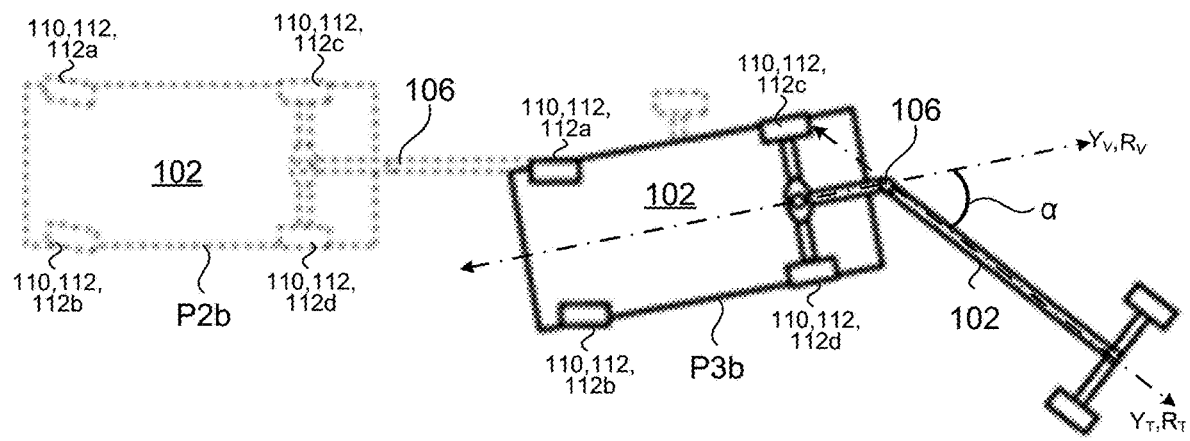

Referring to FIG. 3B, once the trailer angle φ is equal to zero, then the tow vehicle 102 performs a second maneuver by turning its wheels 112 at position P2b, more specifically its front wheels 112a, 112b to the left or the right and in a third maneuver begins moving in the rearward direction $R_V$ causing the trailer 104 to also move in the rearward direction $R_T$ as shown at position P3b. The movement of the tow vehicle 102 and thus the trailer 104 in the rearward directions $R_V$, $R_T$ causes the trailer angle φ to change to a non-zero angle.

Figure 3C:
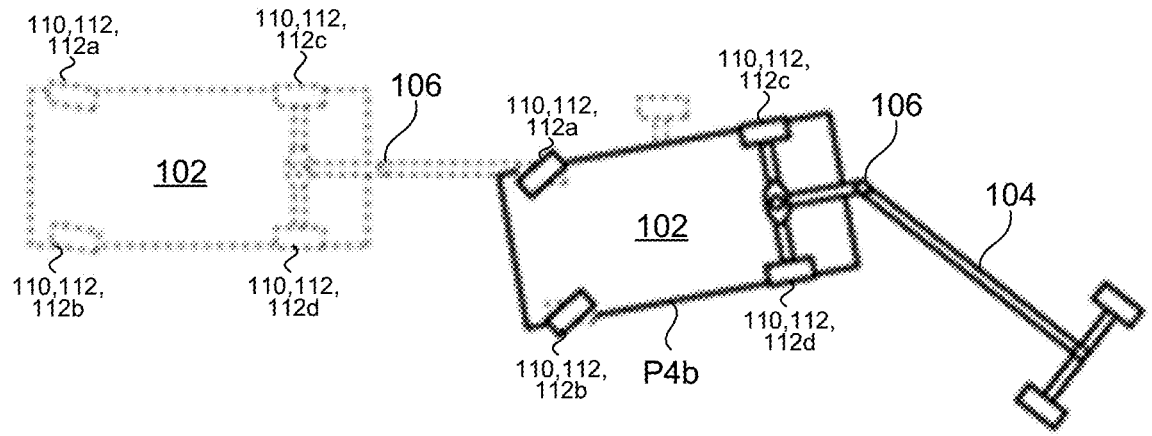

Referring to FIG. 3C, once the vehicle controller 150 detects the orientation change, i.e., the trailer angle φ being non-zero, the front wheels 112a, 112b of the tow vehicle 102 are turned in an opposite direction in a fourth maneuver as shown at position P4b in FIG. 3C. For example, if the front wheels 112a, 112b were turned to the right in FIG. 3B, then the front wheels 112a, 112b are turned to the left in FIG. 3C. In addition, if the front wheels 112a, 112b were turned to the left in FIG. 3B, then the front wheels 112a, 112b are turned to the left in FIG. 3C.

Figure 3D:
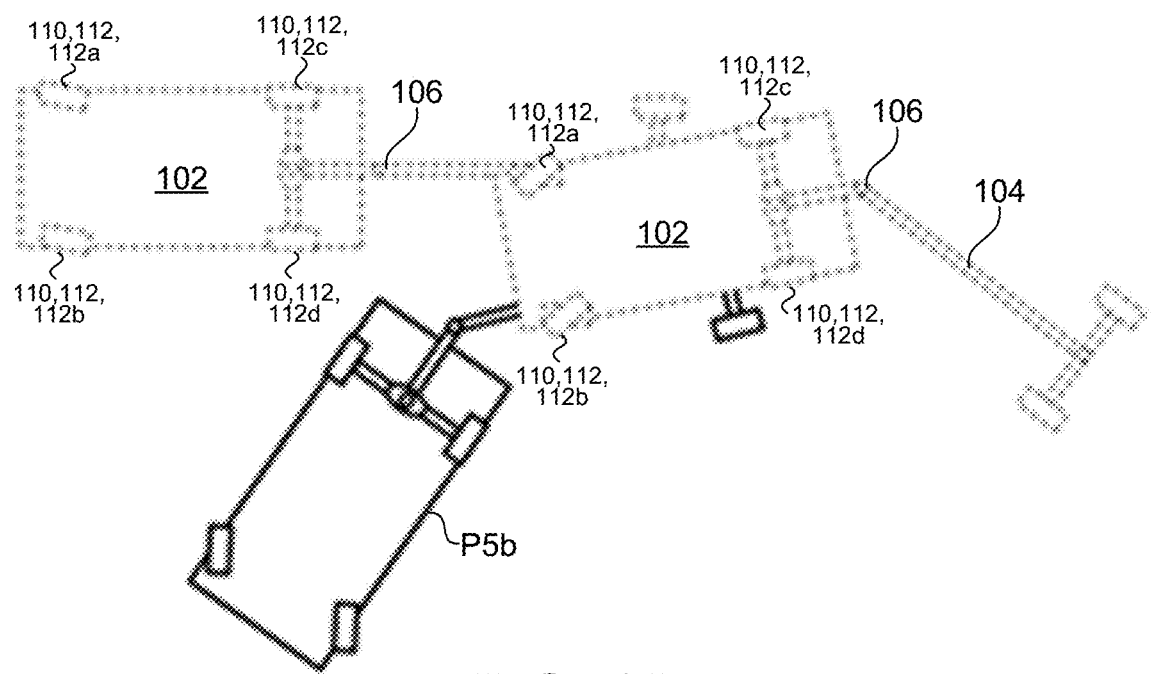
Figure 3E:
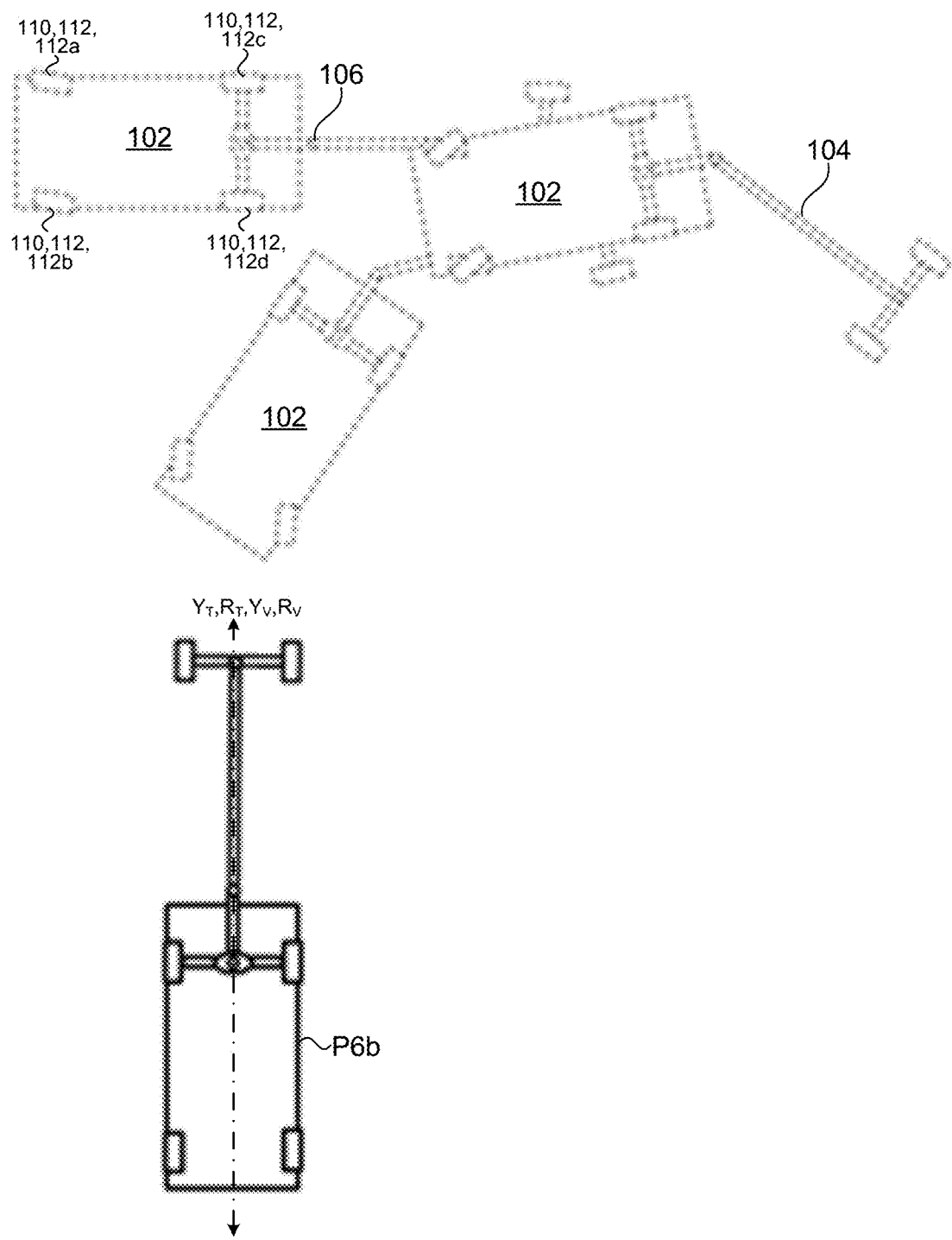

Moreover, once the front wheels 112a, 112b are turned in the opposite direction, the tow vehicle 102 moves in a forward direction $F_V$ in a fifth maneuver as shown in position P5b in FIG. 3D. The vehicle-trailer system 100 continues to move in the forward direction $F_V$ until the trailer reaches a reference position at P6b shown in FIG. 3E. In some examples, the reference position is when the trailer angle φ is equal to zero as shown in FIG. 3E. Similar to the maneuvers described in FIGS. 2A-2D, the vehicle 102 may additionally move in a sequence maneuvers to ensure that the vehicle controller 150 collects enough data points for the trailer parameter identification function 160 to determine the length $L_T$ of the trailer 104.

The trailer parameter identification function 160 receives sensor data 136 from the sensor system 130 while the vehicle 102 drives along the path that includes the predefined maneuvers, specifically from sensors 132, 134 positioned on the back side of the tow vehicle 102, and based on the received sensor data 136 determines the length $L_T$ of the trailer 104. Several methods may be used to determine the length $L_T$ of the trailer 104.

Figure 4:
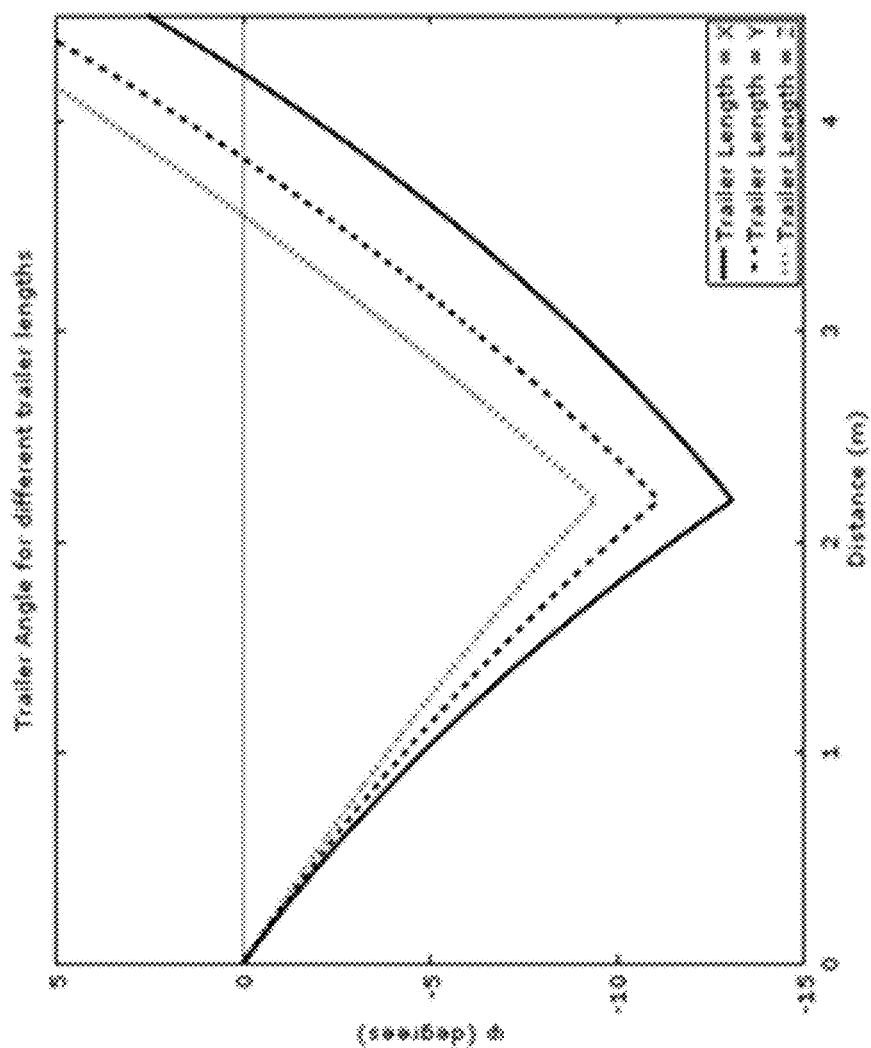
FIG. 4 is a schematic view of an exemplary graph for determining a length of a trailer attached to a tow vehicle.

Referring to FIG. 4, in some implementations, the trailer parameter identification function 160 has a predetermined plot of different trailer angles φ versus traveled distance for trailers 104 having different length $L_T$, and based on the determined trailer angle 9, the function 160 can determine the trailer length $L_T$.

The short maneuvers described with respect to FIGS. 2A-2D and 3A-3E may result in different trailer angles φ for different trailer lengths $L_T$. The trailer angle φ is a function of trailer length $L_T$ and other vehicle parameters as shown in the following time domain differential equation (or its kinematic equivalent):

$$\dot{\varphi} = -\omega_{tow}\left[1 + \frac{L_H}{L_T}\cos(\varphi)\right] - \frac{v_{tow}}{L_T}\sin(\varphi) \quad (1)$$

where, $\omega_{tow}$ is the tow Vehicle's Yaw Rate, $L_H$ is the hitch length (i.e., distance between the center of rear axle of the tow vehicle 102 to the hitch point 106), $L_T$ is the Trailer Length (i.e., the distance between the hitch point 106 and the rear axle of the trailer 104), and $v_{tow}$ is a speed of the tow vehicle 102 (FIG. 2A).

FIG. 4 illustrates a simulated trailer angle φ for three different trailer lengths $L_{T1}$=X, $L_{T2}$=Y, and $L_{T3}$=Z for a particular tow vehicle 102 executing predetermined maneuvers. The X-axis of the graph shows the distance in meters that the tow vehicle 102 covers during the maneuver. In this example, since the data generated by sensors 132, 134 positioned one the rear portion of the tow vehicle 102 and facing rearwards, and is a function of the trailer angle φ, the difference in this generated data may be utilized to identify trailer parameters of interest of other trailers 104, in some examples, the stored sensor data 136 may be mapped to the actual trailer angle φ. In instances where the sensor data 136 includes sensor images 133, a three-dimensional position of the tracked points/features may be identified and the trailer angle φ may be available.

The above method for determining the trailer length $L_T$ is described; however, other method may be used as well that depend on the sensor data 136 received from the sensor system 130.

Figure 5:
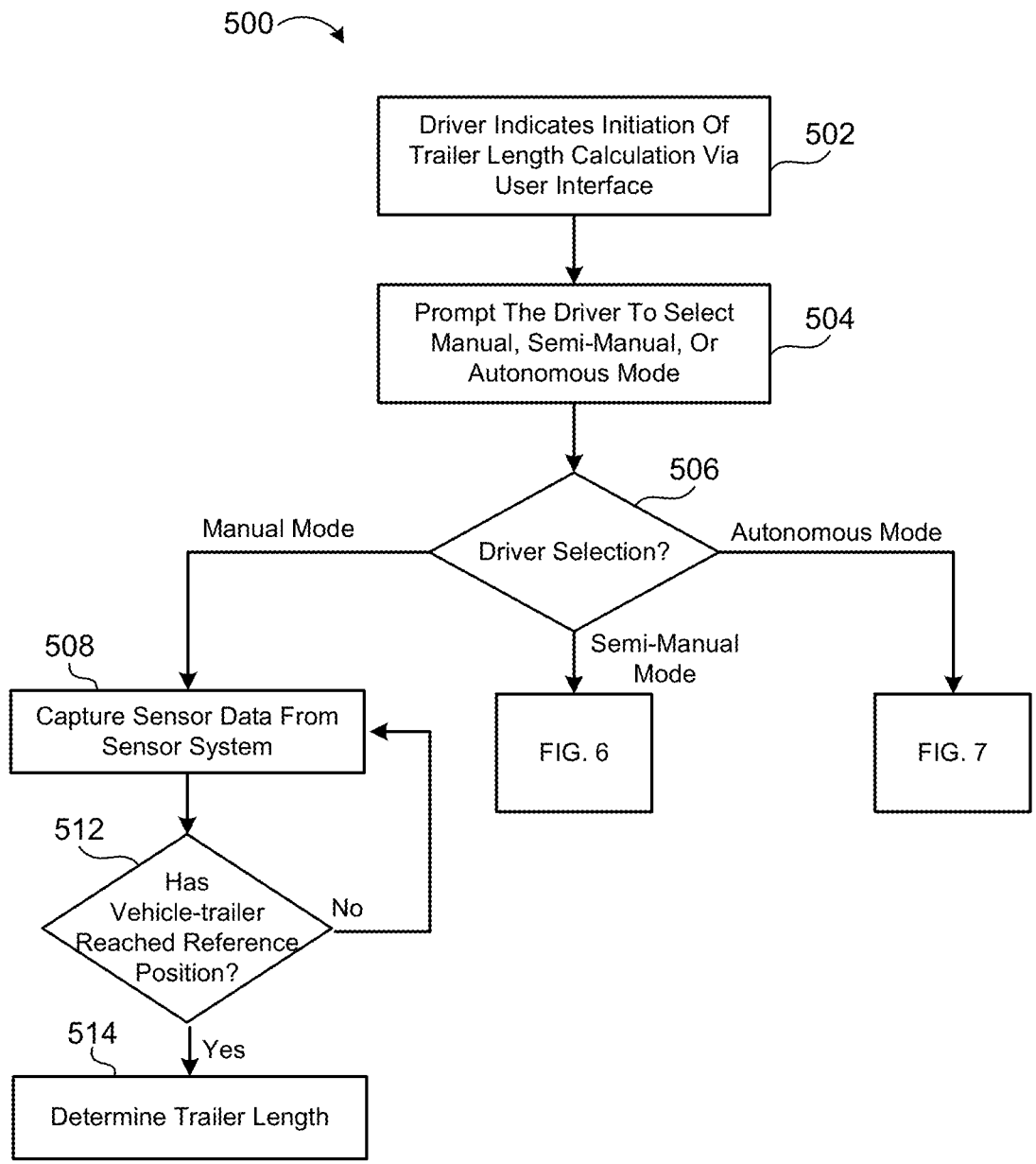
FIG. 5 is a flow diagram of an exemplary arrangement of operations for determining a length of a trailer attached to a tow vehicle.

FIG. 5 illustrates a flow chart 500 of a vehicle 102 having a trailer parameter identification function 160 for detecting a trailer length $L_T$, as described in FIGS. 1A-1C. At block 502, the driver indicates via the user interface 140 of the tow vehicle 102 that the driver wants the vehicle 102, i.e., the vehicle controller 150 to initiates calculation of the trailer length $L_T$. In some examples, the vehicle controller 150 prompts the driver to select one of three modes, a manual mode 160a, a semi-manual mode 160b, or an autonomous mode 160c. For example, referring to FIG. 1A, the display 142 provides the driver with representations 144 of three options, a manual mode representation 144a, a semi-manual mode representation 144b, and an autonomous mode representations 144c. A selection of one of the representations 144a-144c causes the vehicle controller 150 to execute one of the modes 160a-160c. As shown, the driver has the option of selecting a mode from the three available modes 160a-160c; however, in some examples, the driver does not have an option to select and the vehicle controller provides the driver with one of the modes 160a-160c.

At block 506, the vehicle controller 150 determines which selection the driver made. If the driver selected a manual mode 160a, then at block 50 the vehicle controller 150 triggers the sensor system 130 to start capturing sensor data 136 and storing it on the memory hardware 154 as the vehicle 102 is moving along the planned path and sends the sensor data 136 to the trailer parameter identification function 160. In the manual mode 160a, the driver has a set of instructions, for example, a hard copy of a manual or instructions displayed on the user interface 140 that instructs the driver of the maneuvers (FIGS. 2A-2C or FIGS. 3A-3D) that he needs to perform. As such, the driver drives the tow vehicle 102 along the path shown in the FIGS. 2A-2C or FIGS. 3A-3D. At decision block 512, the vehicle controller 150 determines if the vehicle-trailer system 100 has reached the reference position shown in FIG. 2D or 3E. If the vehicle controller 150 determines that the vehicle-trailer system 100 has not reached the reference position, then the sensor system 130 keeps capturing sensor data 136 and sending it to the vehicle controller 150. Once the vehicle-trailer system 100 has reached the reference position, then the trailer parameter identification function 160 has enough data points within the sensor data 136 to determine the length $L_T$ of the trailer 104. At block 506, if driver selects semi-manual mode 160b or if the vehicle controller 150 only provides semi-manual mode 160b, then the vehicle controller 150 executes the process shown in FIG. 6. In addition, at block 506, if the driver selects autonomous mode 160c or if the vehicle controller 150 only provides autonomous mode 160c, then the vehicle controller 150 executes the process shown in FIG. 7.

Figure 6:
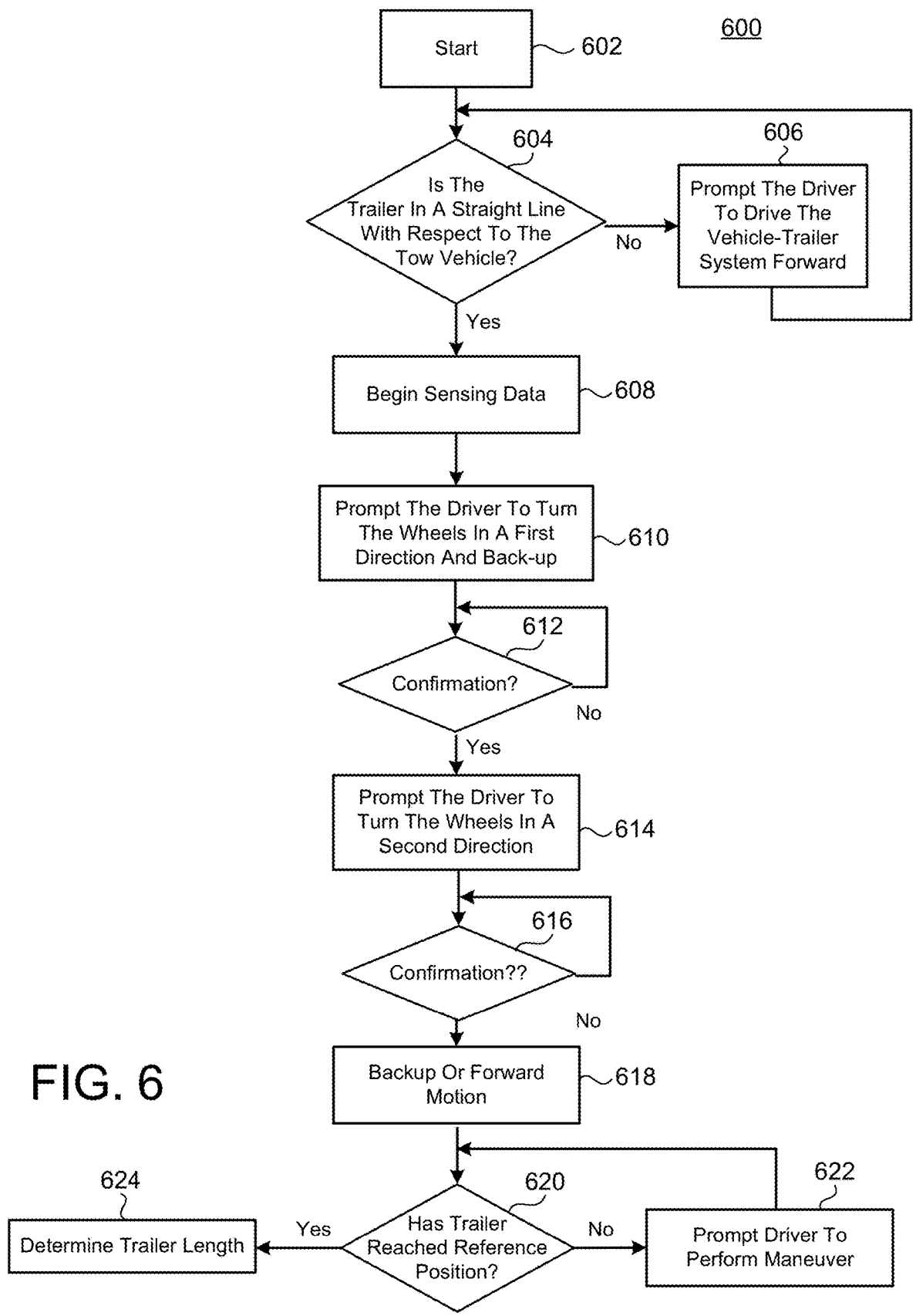
FIG. 6 is a flow diagram of an exemplary arrangement of operations for determining the length of a trailer attached to a tow vehicle in a semi-manual mode.

FIG. 6 shows a flow chart that the vehicle controller 150 executes during the semi-manual mode 160b, which provides the driver with a set of instructions that the driver has to follow, and upon completion of each instruction, the driver provides a confirmation input via the user interface 140 to the trailer parameter identification function 160 before moving to the next instruction. Each instruction includes a maneuver that the driver has to driver the tow vehicle 102 for a period of time or a specific distance. The maneuvers may include, but not limited to, turn left and drive for 40 feet, drive straight for 20 feet, turn left and drive at a speed of 20 miles per hour for 1 minute.

At block 602, the trailer parameter identification function 160 starts executing the semi-manual mode 160b, and at decision block 604, the trailer parameter identification function 160 determines if the trailer 104 is in a straight line with respect to the tow vehicle 102. In other words, the trailer parameter identification function 160 determines if the fore-aft axis $Y_V$ of the tow vehicle 102 is substantially aligned or parallel with the fore-aft axis $Y_T$ of the tow vehicle 102. If the trailer parameter identification function 160 determines that the fore-aft axis $Y_V$ of the tow vehicle 102 is not substantially aligned or parallel with the fore-aft axis $Y_T$ of the tow vehicle 102, then the trailer parameter identification function 160 sends a signal to the user interface 140 to prompt the driver to driver the vehicle-trailer system 100 in a forward direction $F_V$, for example, for a specific distance or a specific time. If, at decision block 604, the trailer parameter identification function 160 determines that the fore-aft axis $Y_V$ of the tow vehicle 102 is substantially aligned or parallel to the fore-aft axis $Y_T$ of the tow vehicle 102, then the trailer parameter identification function 160 begins sensing and/or storing sensor data 136 from the sensor system 130 positioned on the rear portion of the tow vehicle 102. The trailer parameter identification function 160 sends a signal to the user interface 140 to prompt the user to perform a turn maneuver, for example, the trailer parameter identification function 160 sends the user interface 140 a signal to display a message to the driver to turn the wheels 112 of the tow vehicle 102 in a first direction (position P2a shown in FIG. 2B; position P2b shown in FIG. 3B), then drive in the rearward direction $R_V$ (position P3a shown in FIG. 2B; position P3b shown in FIG. 3B). Then at block 612, the trailer parameter identification function 160 waits for the driver to input a confirmation indication via the user interface 140 that the driver did move the wheels 112 in the first direction and drove in the rearward direction $R_V$. At block 614, the trailer parameter identification function 160 sends the user interface 140 a signal to display a message to the driver to turn the wheels 112 of the tow vehicle 102 in a second direction opposite the first direction. The message may indicate that the driver can either stop the tow vehicle 102 and turn the wheels 112 or turn the wheels while the vehicle 102 is moving (FIG. 2C and FIG. 3C). At decision block 616, the trailer parameter identification function 160 waits for a confirmation from the driver via the user interface 140 that the driver performed the maneuver. At block 618, the trailer parameter identification function 160 sends the user interface 140 a signal to display a message to the driver to drive the tow vehicle 102 in a rearward direction R (FIG. 2D) or a forward direction (FIG. 3D). Then at decision block 620, the trailer parameter identification function 160 determines if the trailer 104 has reached the reference position (position P5a shown in FIG. 2D; position P6b shown in FIG. 3E), or in other words, the trailer parameter identification function 160 determines if it has enough data points to calculate or determine the trailer length $L_T$. If the trailer parameter identification function 160 determines that it needs more data points to determine the trailer length $L_T$, then at block 622, the trailer parameter identification function 160 sends a message to the user interface 140 to prompt the driver to perform a specific maneuver that is needed to get more data points. Once the trailer parameter identification function 160 has enough data points and the trailer 104 has reached a reference position at decision block 620, then at block 624, the trailer parameter identification function 160 determines the length $L_T$ of the trailer 104.

Figure 7:
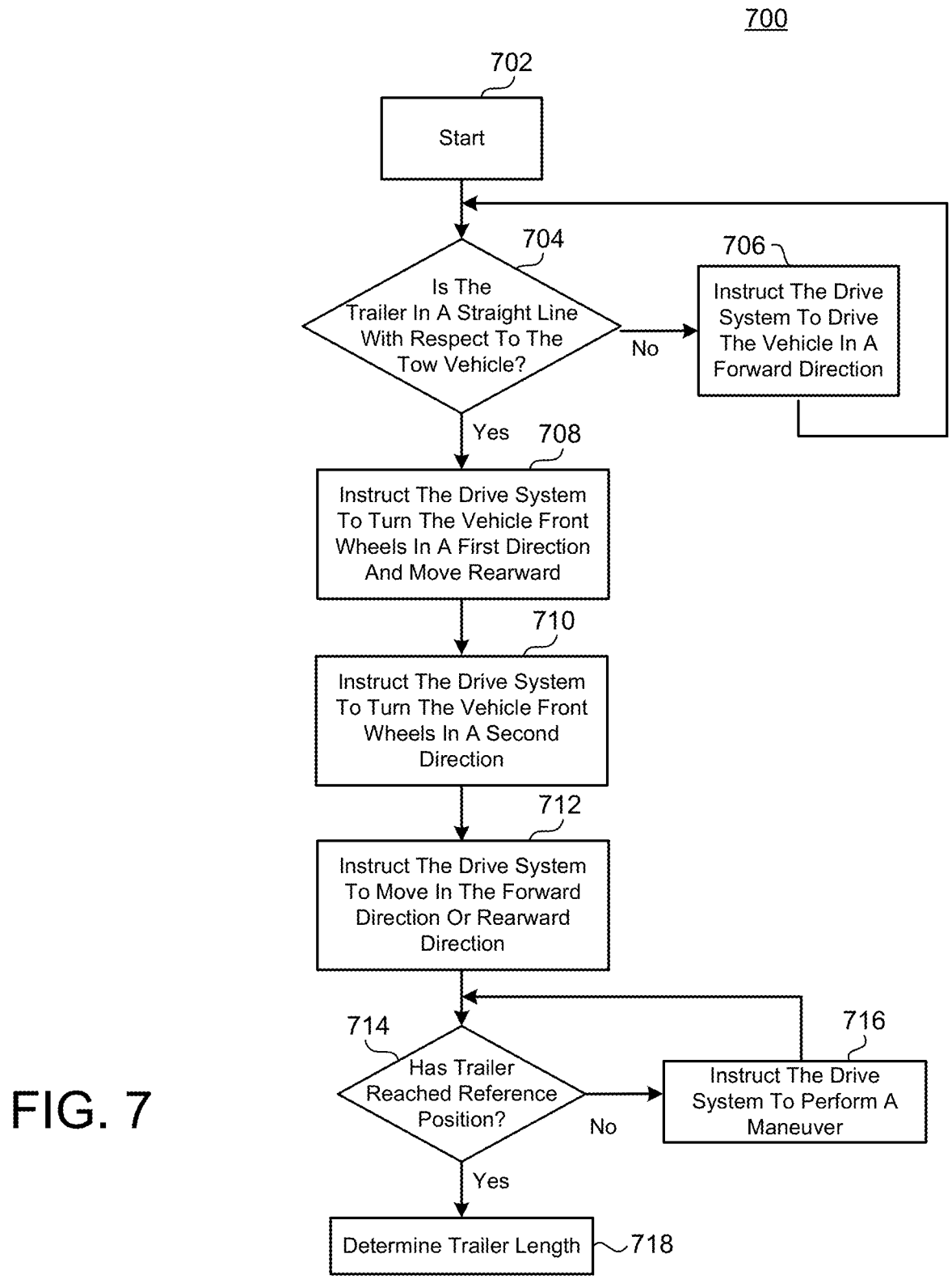
FIG. 7 is a flow diagram of an exemplary arrangement of operations for determining the length of a trailer attached to a tow vehicle in an autonomous mode.

FIG. 7 shows a flow chart 700 that the vehicle controller 150 executes during the autonomous mode 160c. The autonomous mode 160c allows the driver to instruct the vehicle controller 150 via the user interface 140, that he/she wants the vehicle controller 150 to autonomously maneuver the vehicle-trailer system 100 along the paths described in FIGS. 2A-2D or FIGS. 3A-3D and determine the length $L_T$ of the trailer 104. During the autonomous mode 160c, the vehicle controller 150 receives sensor data 136 from sensors positioned around the vehicle 102 and in some examples in the trailer 104 as well.

Upon the driver selection of the autonomous mode 160c the vehicle controller 150 begins executing the trailer parameter identification function 160 in the autonomous mode 160c at block 702. Similar to the semi-manual mode 160b, at decision block 704, the trailer parameter identification function 160 determines if the trailer 104 is in a straight line with respect to the tow vehicle 102. In other words, the trailer parameter identification function 160 determines if the fore-aft axis $Y_V$ of the tow vehicle 102 is substantially aligned or parallel with the fore-aft axis $Y_T$ of the tow vehicle 102. If the trailer parameter identification function 160 determines that the fore-aft axis $Y_V$ of the tow vehicle 102 is not substantially aligned or parallel with the fore-aft axis $Y_T$ of the tow vehicle 102, then the trailer parameter identification function 160 sends a signal to the driver assistance system 170 to send a command 174 to the drive system 110 that causes the vehicle-trailer system to be aligned, at block 706. For example, the driver assistance system 170 instructs the drive system 110 to move in the forwards direction until the vehicle-trailer system 100 is aligned, or in other words, the tow vehicle 102 and the trailer 104 are aligned.

Referring back to decision block 704, if the tow vehicle 102 and the trailer 104 are aligned, then at block 708, the vehicle controller 150 instructs the drive system 110 to turn the front wheels 112a, 112b in a first direction and move in a rearward direction $R_V$ also causing the trailer 104 to move in the rearward direction $R_T$. At block 710, the vehicle controller 150 instructs the drive system 110 to turn the vehicle front wheels 112a, 112b in a second direction. For examples, as shown in FIG. 2C, the second direction is a direction opposite from the first direction, while the second direction shown in FIG. 3C is a direction having a greater angle than the first direction. The drive system 110 may either turn the vehicle front wheels 112a, 112b in the second direction without stopping or stop the tow vehicle 102 then turn the front wheels 112a, 112b.

At block 712, the vehicle controller 150 instructs the drive system 110 to move in the forward direction (FIG. 2D) or the rearwards direction (FIG. 3E). Then at decision block 714, the vehicle controller 150, for example, the trailer parameter identification function 160 determines if the trailer 104 has reached the reference position (position P5a shown in FIG. 2D; position P6b shown in FIG. 3F). In other words, the trailer parameter identification function 160 determines if it has enough data points to calculate or determine the trailer length $L_T$. If the trailer parameter identification function 160 determines that it needs more data points to determine the trailer length $L_T$, then at block 716, the vehicle controller 150 instructs the drive system 110 to perform a maneuver that allows the trailer parameter identification function 160 to receive additional sensor data 136 from the sensor system 130 allowing the trailer parameter identification function 160 to determine the length $L_T$ of the trailer 104. Once the trailer parameter identification function 160 has enough data points and the trailer 104 has reached a reference position at decision block 714, then at block 718, the trailer parameter identification function 160 determines the length of the trailer 104.

FIGS. 8A-9D provide another method for determining the trailer length $L_T$ based on a simulation of one or more virtual trailer movements in addition to the movement of the actual trailer representation 804 in real time. The controller 150, i.e., the trailer parameter identification function 160, simulates a sequence of virtual trailers 802, each associated with a different trailer axle length $L_{VT1}$, $L_{VT2}$ and determines the actual trailer length $L_T$ based on the simulation of the movement of the one or more virtual trailers 802 having different trailer axle lengths $L_{VT1}$, $L_{VT2}$.

Figure 8A:
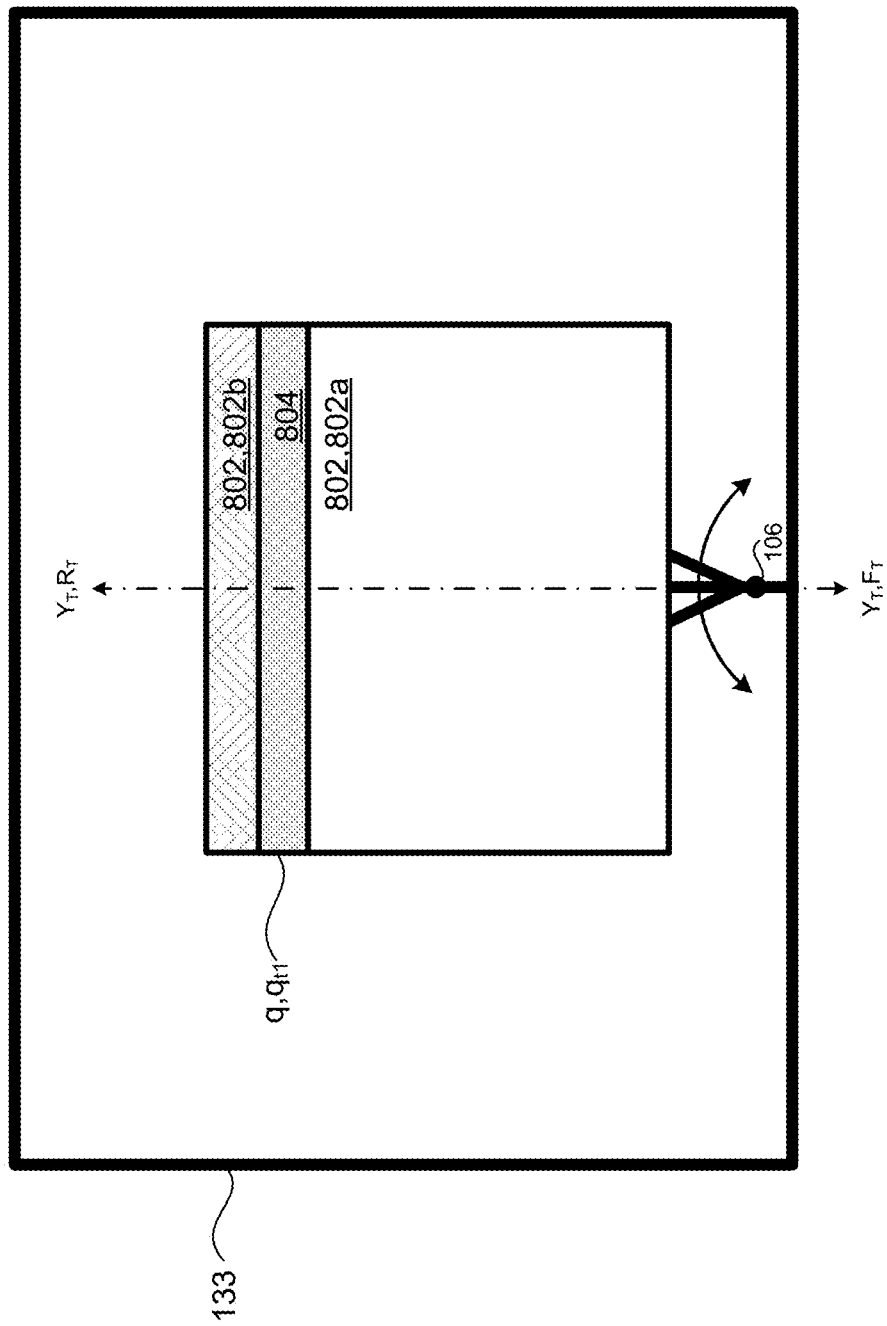
FIGS. 8A and 8B are schematic views of an exemplary image including a vehicle representation and two virtual trailers.
Figure 8B:
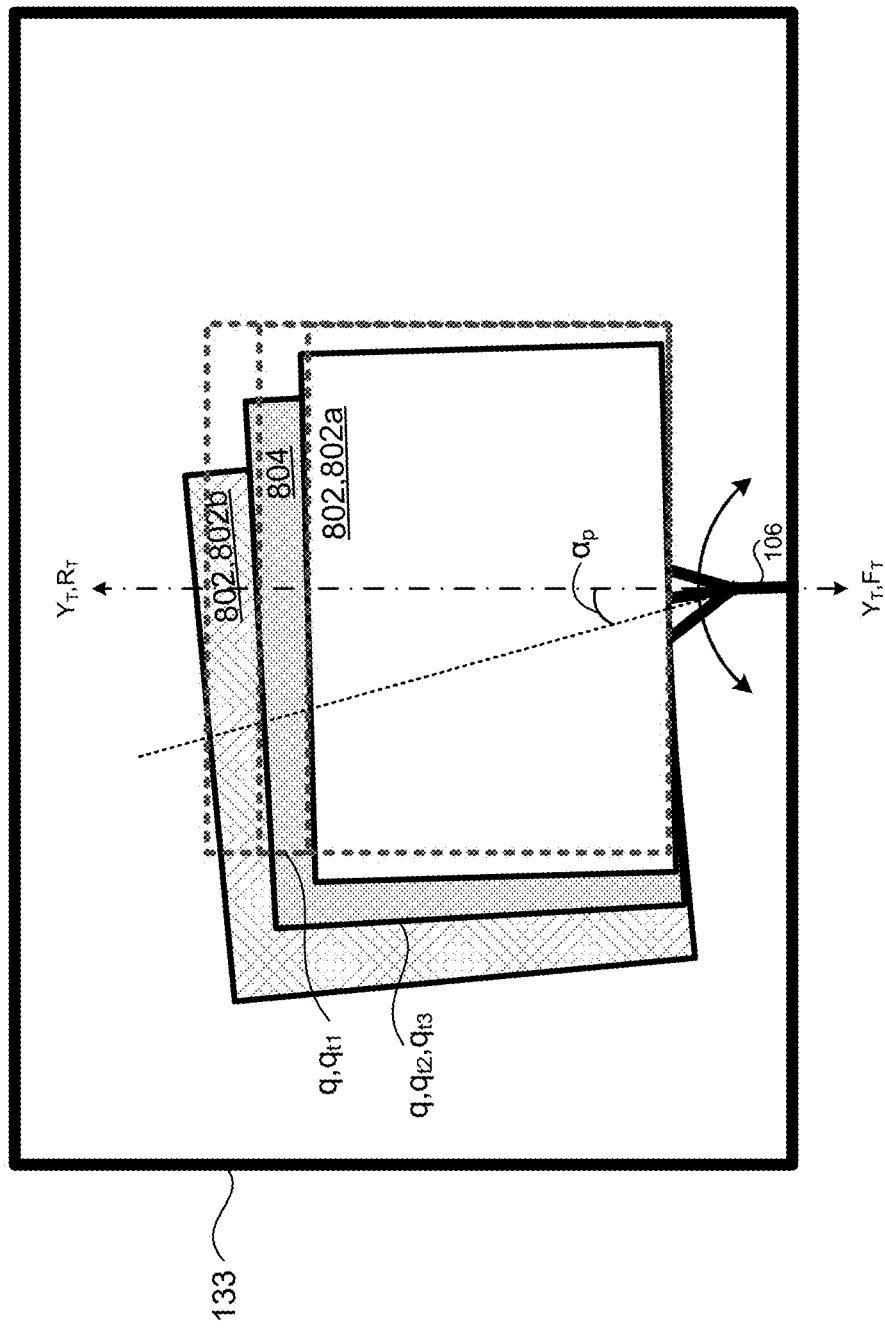

FIGS. 8A and 8B illustrate the virtual trailer 802 overlain on the images 133 received from the rear camera 132a where each image 133 includes a trailer representation 804 of the actual trailer 104. While FIGS. 9A-9D show a real time graph 900a associated with movements of the virtual trailers 802 and the trailer representations 804.

In some examples, as the tow vehicle 102 is performing maneuvers, such as, but not limited to the maneuvers described in FIGS. 2A-2D or FIGS. 3A-3E, the vehicle controller 150 receives images 133 from the rear camera 132a, For each received image 133, the vehicle controller 150 identifies the trailer representation 804 within the received image(s) 133 and associates a first actual trailer generalized position q, $q_{t1}$ with the trailer representations 804. The generalized position q, $q_{t1}$ may be in any coordinate system. In some examples, the generalized position is the position of the pixels associated with the trailer representation 804 within the image 133. The controller 150 also overlays one or more virtual trailers 802, 802a, 802b on the image 133. Additional virtual trailers may also be overlaid on the images 133. As shown, a first virtual trailer 802a represents a trailer having the same width and height of the actual trailer 104, however a shorter axle length $L_{VT1}$ than the axle length $L_T$ of the actual trailer 104. While a second virtual trailer 802b represents a trailer having the same width and height of the actual trailer 104, however a longer axle length $L_{VT2}$ than the axle length $L_T$ of the actual trailer 104. FIG. 8A shows a first position of the trailer representation 804 being aligned with the vehicle 102, also referred to as a straight trailer. As shown, the generalized positions q associated with the actual trailer representation 804 and the virtual trailers 802a, 802b are the same, since all the trailers 802, 804 are aligned with the vehicle 102. As the tow vehicle 102 is performing a maneuver, the behavior of the generalized trailer position q may be compared with the behavior of the virtual trailers 802a, 802b to determine the length $L_T$ of the trailer 104.

FIG. 8A shows the trailer representation 804 and the virtual trailers 802a, 802b at an initial position being aligned with the vehicle 102. FIG. 8B shows the trailer representation 804 and the virtual trailers 802a, 802b while the trailer 104 is following the maneuvers described in FIGS. 2A-2D or FIGS. 3A-3E. The controller 150 records the time s at which the virtual trailers 802a, 802b reach a predefined angle $\alpha_p$ with respect to the fore-aft axis $Y_T$, the position of the trailer representation 804 at the recorded time s, and the time at which the trailer representation 804 reaches the predefined angle $\alpha_p$ a second time. The predefined angle $\alpha_p$ may be, but is not limited to, 5 degrees, 10 degree, 20 degrees, or any other angle.

FIG. 9A shows a graph of trajectories 904, 902a, 902b of the actual trailer 104 and the first and second trailers 804a, 804b as they follow the maneuvers. An actual trajectory 904 represents a trajectory of the actual trailer 104. A first trajectory 902a is associated with the first virtual trailer 802a and a second trajectory 902b is associated with the second virtual trailer 802b. The horizontal axis represents the time s, while the vertical axis represents the generalized position q. In some implementations, the generalized position q is associated with a trailer angle φ. Therefore, each time the trailer 104 moves then the trailer representation 804 moves as well. In other words, if the trailer 104 moves causing the trailer angle φ to increase, then the position q of the trailer representation 804 also increases. If the trailer 104 moves causing the trailer angle φ to decrease, then the position q of the trailer representation 804 also decreases. When the trailer angle φ is stationary, so is the position q of the trailer representation 804. As such, the controller 150 considers that for each trailer angle φ a single position q is also obtained. In some examples, at a first step, when the virtual trailer 802a, 802b crosses the predefined angle $\alpha_p$, the controller 150 records the time s and the actual trailer position q as shown at (b) in FIGS. 9C and 9D. Then the controller 150 records the time s that the virtual trailer 802a, 802b returns to the predefined angle $\alpha_p$, as shown at (c) in FIGS. 9C and 9D. Finally, the controller 150 records the time s at which the position q of the trailer representation 804 returns to the position recorded at (b). The controller 150 determines a first difference of the time s at (h) and (c) which result in a virtual time difference. In addition, the controller determines a second difference in time s at (b) and (d) which results in a measured time difference. A third difference between the virtual time difference and the actual time difference results in a value having one sign for all virtual trailers 802a shorter than the actual trailer 104 (e.g., a negative sign) and another sign for all virtual trailers 802b longer than the actual trailer 104 (e.g., a positive sign). The controller 150 interpolates between the two values determined by the third difference, which results in an estimated trailer axle length $L_T$ associated with the actual trailer 104. Several interpolation techniques may be used.

Figure 9B:
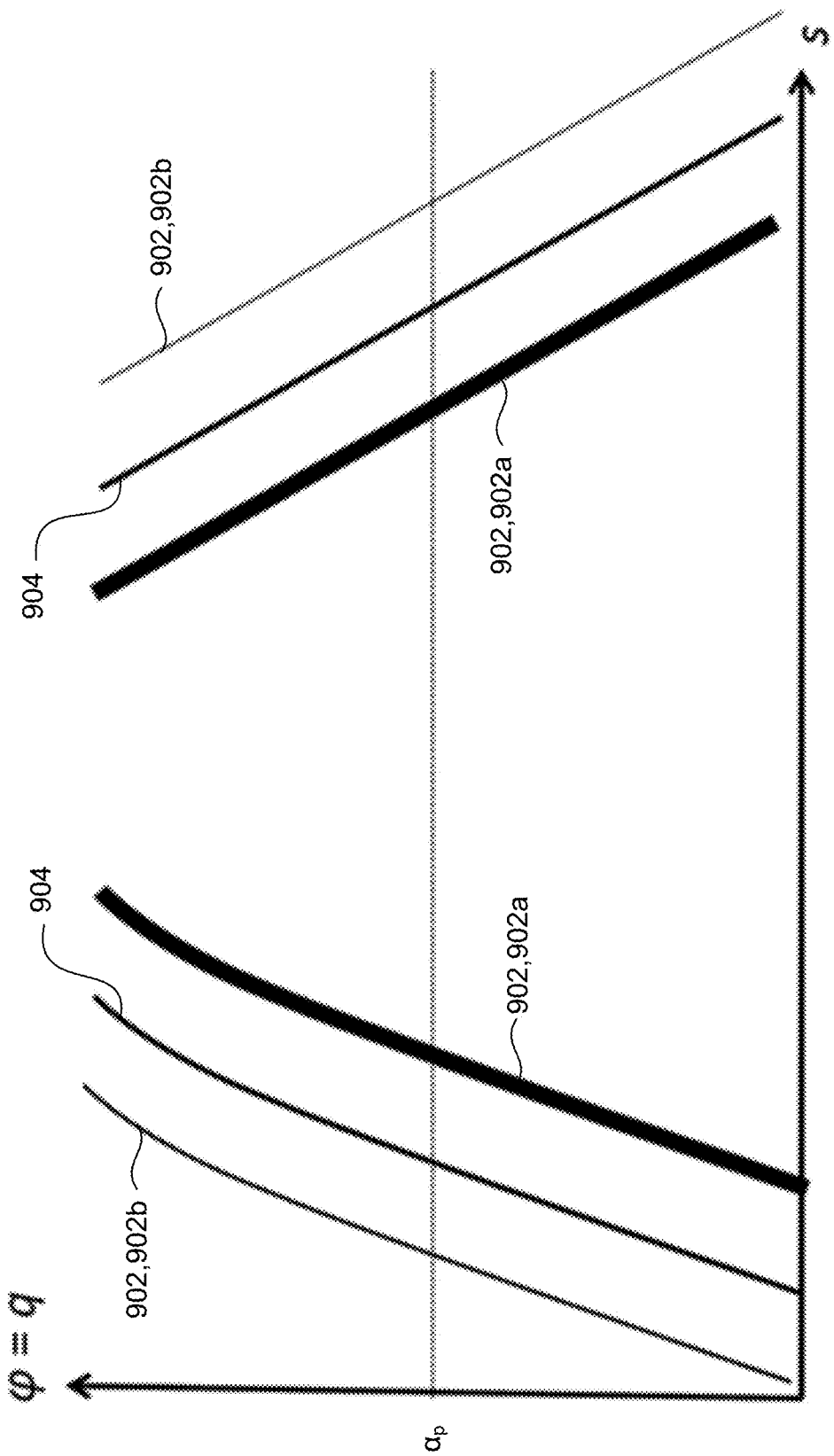
Figure 9C:
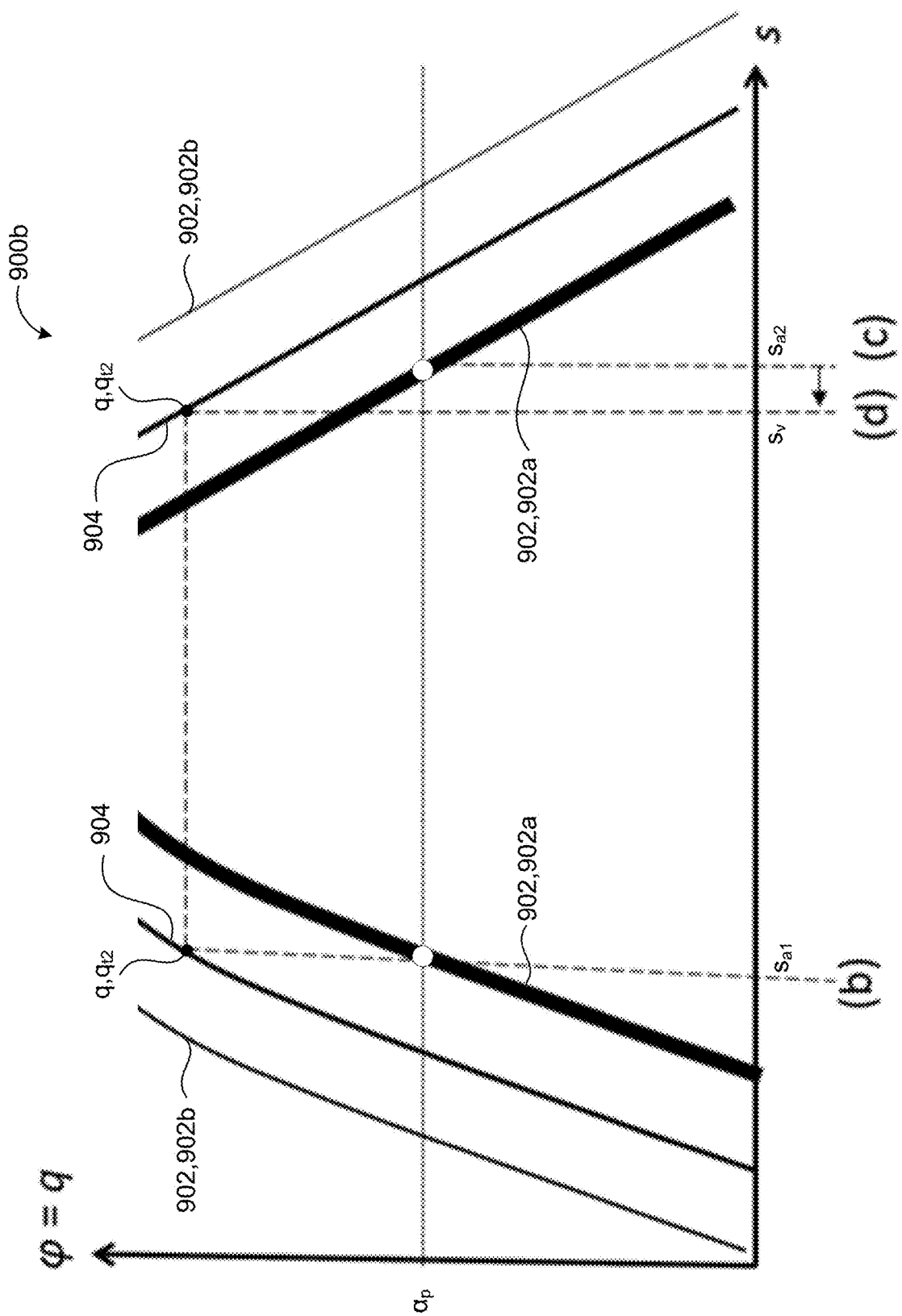

Referring to FIG. 9C, with respect to the first virtual trailer 802a, the controller 150 records a first time $s_{a1}$ at which the first virtual trailer 802a crosses the predefined angle $\alpha_p$ and the position $q_{t2}$ of the trailer representation 802 within the image 133, as shown at (b). Then the controller 150 records a second time $s_{a2}$ at which the first virtual trailer 802a returns to the predefined angle $\alpha_p$, as shown at (c). Finally, the controller 150 records the time $s_V$ at which the position q of the trailer representation 804 returns to the position recorded at (b), i.e., position $q_{t2}$. The controller 150 then determines a first difference $D_{a1}$ of the time $s_{a1}$ (b) and $s_{a2}$ (c) which result in a virtual time difference ($D_{a1}=s_{a2}-s_{a1}$). In addition, the controller determines a second difference $D_{a2}$ in time $s_{a1}$ at (b) and $s_V$ (d) which results in a measured time difference ($D_{a2}=s_V-s_{a1}$). The controller 150 determines the third difference $D_{a3}$ between the virtual time difference $D_{a1}$ and the actual time difference $D_{a2}$, which results in a value having one sign for all virtual trailers 802a shorter than the actual trailer 104 (e.g., a negative sign) and another sign for all virtual trailers 802b longer than the actual trailer 104 (e.g., a positive sign).

Figure 9D:
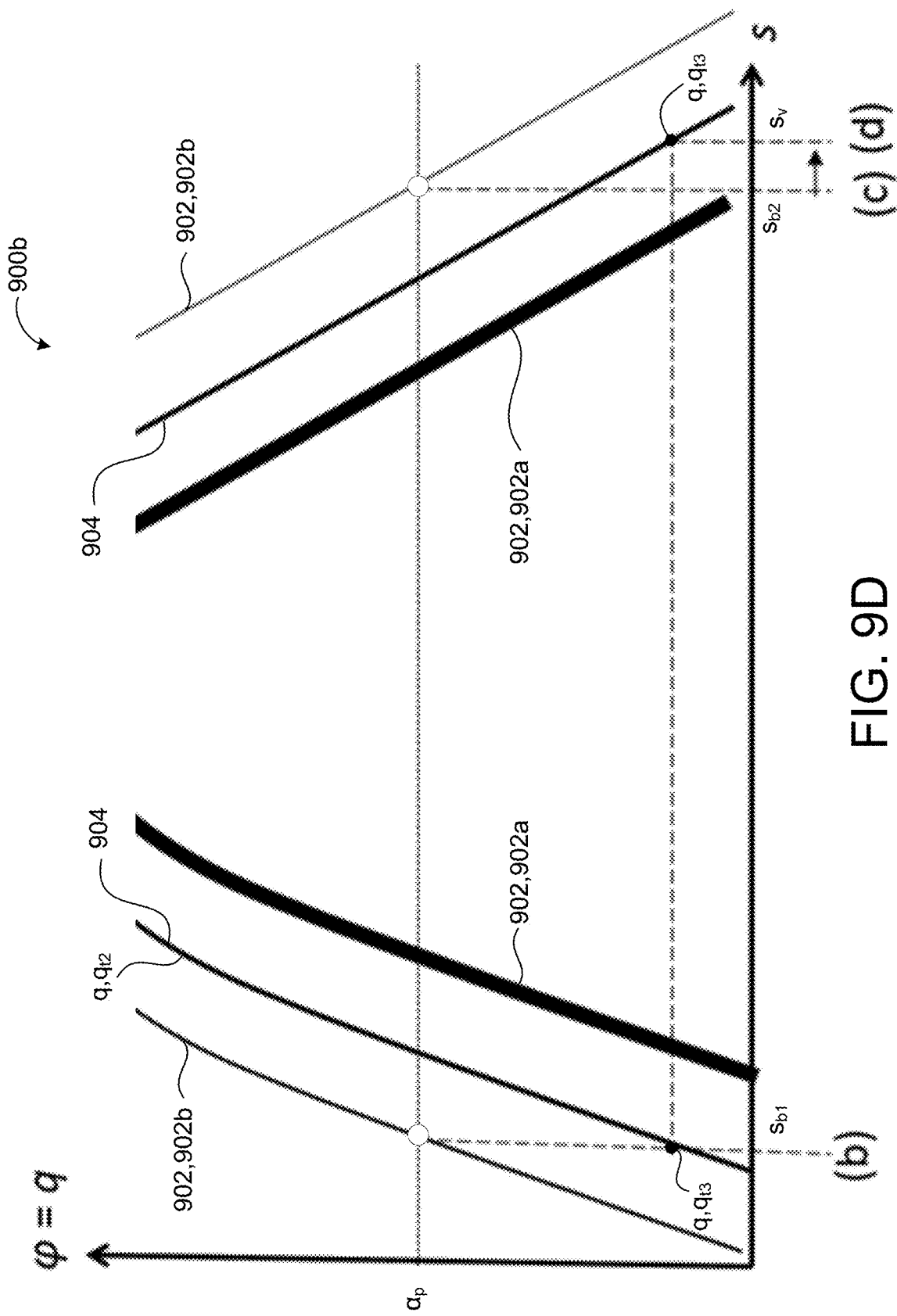

Referring to FIG. 9D, with respect to the second virtual trailer 802b, the controller 150 records a first time $s_{b1}$ at which the second virtual trailer 802b crosses the predefined angle $\alpha_p$ and the position go of the trailer representation 802 within the image 133, as shown at (b). Then the controller 150 records a second time $s_{b2}$ at which the second virtual trailer 802b returns to the predefined angle $\alpha_p$ as shown at (c). Finally, the controller 150 records the time $s_V$ at which the position q of the trailer representation 804 returns to the position recorded at (b), i.e., position $q_{t3}$. The controller 150 then determines a first difference $D_{b1}$ of the time $s_{b1}$ at (b) and $s_{b2}$ (c) which results in a virtual time difference ($D_{b1}=s_{b2}-s_{b1}$). In addition, the controller 150 determines a second difference Db2 in time $s_{b1}$ at (b) and $s_V$ (d) which results in a measured time difference ($D_{b2}=s_c-s_{b1}$). The controller 150 determines the third difference $D_{b3}$ between the virtual time difference $D_{b1}$ and the actual time difference $D_{b2}$, which results in a value having a sign opposite to the sign of the third difference determined in FIG. 9C.

Referring back to FIGS. 9A-9D, the controller 150 interpolates between the two values determined by the third difference $D_{a3}$, $D_{b3}$, which results in an estimated trailer axle length $L_T$ associated with the actual trailer 104. In some examples, the controller 150 executes higher order interpolation scheme across more than two virtual trailers 802. The same method may also be applied to multiple predefined angles α in a single event, i.e., in real time. An estimate may be rejected as erroneous if the values of q and s for the various angles α are not within a predefined tolerance. The controller 150 may execute a coarse length detection scheme by cycling through the data a second time with a finer set of virtual trailer axle length $L_t$ values in the close vicinity of the original prediction.

In some implementations, while the vehicle-trailer system 100 is executing the maneuvers which allow the controller 150 to estimate the length $L_T$ of the trailer 104, for each generalized position q of the trailer representation 804, the controller 150 determines a trailer angle φ of the actual trailer 104. Therefore, once the controller 150 completes estimating the length $L_T$ of the trailer 104, the controller 150 may generate a mapping of the generalized positions q to the trailer angles φ. The controller 150 may then use the mapping to determine an estimated trailer angle φ based on a generalized position q, or vice versa.

The controller 150 described above is capable of determining the trailer length $L_T$ rapidly and automatically, with simultaneous trailer angle calibration (e.g., mapping the generalized positions q to the actual trailer angles (p, as described above). In addition, the controller 150 provides a target less solution, which means that the driver does not have to add a marker or sticker on the trailer 104 to identify the trailer 104 for the trailer length detection. As such, the described system reduces complexity and cost of the embedded hardware needed to run the trailer length detection algorithms. In addition, the system limits the manual calibration needed by the driver, which may be prone to errors in measuring the trailer and or inputting the measure trailer length in the system.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information tier transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for determining a trailer length of a trailer attached to a tow vehicle while the tow vehicle follows a path, the tow vehicle having one or more sensors positioned on a back portion of the tow vehicle facing the trailer, the method comprising:

receiving, at a data processing hardware in communication with the one or more sensors, first sensor data associated with a first position of the tow vehicle along the path;

receiving, at the data processing hardware, second sensor data associated with a second position of the tow vehicle along the path, the second position being different from the first position;

receiving, at the data processing hardware, third sensor data associated with a third position of the tow vehicle along the path, the third position being different from the first position and the second position;

determining, at the data processing hardware, a trailer length based on the first, second, and third sensor data;

transmitting from the data processing hardware to a user interface in communication with the data processing hardware, instructions to display the trailer length, wherein the one or more sensors comprises at least one of at least one camera, at least one LIDAR sensor, at least one LADAR sensor, at least one radar sensor, or at least one sonar sensor;

transmitting, from the data processing hardware to a user interface in communication with the data processing hardware, a command instructing the user interface to display a representation of a manual mode, a representation of a semi-manual mode, and a representation of an autonomous mode;

receiving, at the data processing hardware from the user interface, a selection of one of the representations of the manual mode, the semi-manual mode, and the autonomous mode;

receiving, at the data processing hardware, the selection of the autonomous mode;

receiving, at the data processing hardware, sensor data associated with sensors positioned on a front portion and side portions of the tow vehicle;

determining, at the data processing hardware, a vehicle path comprising one or more maneuvers that include positioning the tow vehicle at the first, second, and third positions, the one or more maneuvers comprising a first maneuver including turning front wheels of the tow vehicle in a first direction and moving the tow vehicle in a reverse direction to the first position, and a second maneuver including turning front wheels of the tow vehicle in a second direction opposite the first direction and moving the tow vehicle in the reverse direction or a forward direction to the second position; and instructing a drive system in communication with the data processing hardware to follow the vehicle path.

2. The method of claim 1, further comprising, before receiving the second sensor data:

determining, at the data processing hardware, a first trailer angle between the tow vehicle and the trailer based on the first sensor data; and when the first trailer angle is not equal to zero, determining a second trailer angle after the tow vehicle has moved from the first position to the second position.

3. The method of claim 1, wherein a distance between the first position and the second position, and a distance between the second position and the third position are each less than a predetermined distance.

4. The method of claim 1, further comprises:

receiving, at the data processing hardware, the selection of the semi-manual mode;

before receiving the first sensor data associated with the first position of the tow vehicle:

transmitting, from the data processing hardware to the user interface, a command instructing the user interface to display a first maneuver to be taken by a driver of the tow vehicle to move the tow vehicle from an initial position to the first position, the first maneuver comprising turning front wheels of the tow vehicle in a first direction and moving the tow vehicle in a reverse direction;

receiving, at the data processing hardware, a confirmation from the driver via the user interface, the confirmation indicative of the driver following the first maneuver;

transmitting, from the data processing hardware to the user interface, a command instructing the user interface to display a second maneuver to be taken by the driver to move the tow vehicle from the first position to the second position, the second maneuver comprising turning the front wheels of the tow vehicle in a second direction opposite to the first direction and moving the tow vehicle from the first position to the second position in the reverse direction or in a forward direction; and receiving, at the data processing hardware, a confirmation from the driver via the user interface, the confirmation indicative of the driver following the second maneuver.

5. The method of claim 1, wherein the one or more sensors comprises at least one of at least one camera, at least one LIDAR sensor, at least one LADAR sensor, or at least one sonar sensor.

6. A method for determining a length of a trailer attached to a tow vehicle, the tow vehicle having one or more sensors positioned on a back portion of the tow vehicle facing the trailer, the method comprising:

receiving, at a data processing hardware in communication with the one or more sensors, first sensor data associated with a first position of the tow vehicle;

determining, by the data processing hardware, a trailer angle between the tow vehicle and the trailer based on the first sensor data;

when the trailer angle is not equal to zero:
receiving, at the data processing hardware, second sensor data associated with a second position of the tow vehicle after the tow vehicle has moved along a straight path for a first threshold distance; and
determining, by the data processing hardware, the trailer angle based on the second sensor data;

when the trailer angle is equal to zero:
receiving, at the data processing hardware, third sensor data associated with a third position after the tow vehicle has moved in a first direction for a second threshold distance;
receiving, at the data processing hardware, fourth sensor data associated with a fourth position after the tow vehicle has moved in a second direction being different from the first direction;
determining, at the data processing hardware, the length of the trailer based on the third sensor data and the fourth sensor data, transmitting, from the data processing hardware to a user interface in communication with the data processing hardware, a command instructing the user interface to display a representation of a manual mode, a semi-manual mode, and an autonomous mode;

receiving, at the data processing hardware, the selection of the semi-manual mode;

when in the semi-manual mode:

before receiving the third sensor data associated with the third position of the tow vehicle, transmitting, from the data processing hardware to the user interface, a command instructing the user interface to display a first maneuver to be taken by a driver of the tow vehicle to move the tow vehicle from the second position to the third position, the first maneuver comprising turning front wheels of the tow vehicle in a first direction and moving the tow vehicle in a reverse direction;

receiving, at the data processing hardware, a confirmation from the driver via the user interface, the confirmation indicative of the driver having followed the first maneuver, transmitting, from the data processing hardware to the user interface, a command instructing the user interface to display a second maneuver to be taken by the driver to move the tow vehicle from the third position to the fourth position, the second maneuver comprising turning the front wheels of the tow vehicle in a second direction opposite to the first direction and moving the tow vehicle from the third position to the fourth position in the reverse direction or in a forward direction; and receiving, at the data processing hardware, a confirmation from the driver via the user interface, the confirmation indicative of the driver having followed the second maneuver.

7. The method of claim 6, wherein the first threshold distance and the second threshold distance are less than a predetermined distance.

8. The method of claim 6, further comprising:
receiving, at the data processing hardware, the selection of the autonomous mode;
when in the autonomous mode:
receiving, at the data processing hardware, sensor data associated with sensors positioned on a front portion and side portions of the tow vehicle;
determining, at the data processing hardware, a vehicle path comprising one or more additional maneuvers that include fifth and sixth positions of the tow vehicle, the one or more additional maneuvers comprising a third maneuver including turning front wheels of the tow vehicle in one of the first direction or the second direction, and moving the tow vehicle in a reverse direction to the fifth position, and a fourth maneuver including turning front wheels of the tow vehicle in the other one of the first direction and the second direction, and moving the tow vehicle in the reverse direction or a forward direction to the sixth position, wherein the length of the trailer is based on the fifth position and the sixth position; and
instructing a drive system in communication with the data processing hardware to follow the vehicle path.

9. The method of claim 6, wherein the one or more sensors comprises at least one of at least one camera, at least one LIDAR sensor, at least one LADAR sensor, at least one radar sensor, or at least one sonar sensor.

10. A method for determining a trailer length of a trailer attached to a tow vehicle, the tow vehicle having one or more sensors positioned on a back portion of the tow vehicle facing the trailer, the tow vehicle executing maneuvers causing the tow vehicle and the trailer to move, the method comprising:

receiving, at a data processing hardware in communication with the one or more sensors, one or more images of a rear environment of the tow vehicle including a trailer representation associated with the trailer;

overlaying, at the data processing hardware, one or more virtual trailers on the one or more images, the one or more virtual trailers having a width and a height equaling a trailer width and a trailer height, respectively, associated with the trailer;

for each one of the one or more virtual trailers:
storing, at hardware memory in communication with the data processing hardware, a first time when the virtual trailer reaches a predetermined trailer angle, the predetermined trailer angle indicative of an angle between the virtual trailer and the tow vehicle;
storing, at the hardware memory, a trailer representation position of the trailer representation within the one or more images at the first time;
storing, at the hardware memory, a second time when the virtual trailer reaches the predetermined trailer following the first time; and
storing, at the hardware memory, a third time when the trailer representations reaches the trailer representation position following the first time;

determining, at the data processing hardware, the trailer length of the trailer based on the first time, the second time, and the third time; and transmitting from the data processing hardware to a user interface in communication with the data processing hardware, instructions to display the trailer length.

11. The method of claim 10, further comprising:
for each one of the one or more virtual trailers:
determining, at the data processing hardware, a first time difference between the first time and the second time;
determining, at the data processing hardware, a second time difference between the first time and the third time; and
determining, at the data processing hardware, a third difference between the first time difference and the second time difference; and
wherein determining the trailer length of the trailer is based on the third difference associated with each one of the one or more virtual trailers.

12. The method of claim 10, wherein determining the trailer length of the trailer based on the third difference includes interpolating values of between each one of the third difference associated with the one or more virtual trailers.

13. The method of claim 10, wherein the predetermined trailer angle is 10 degrees.

14. The method of claim 10, further comprising:
transmitting, from the data processing hardware to a user interface in communication with the data processing hardware, a command instructing the user interface to display a representation of a manual mode, a representation of a semi-manual mode, and a representation of an autonomous mode; and
receiving, at the data processing hardware from the user interface, a selection of one of the representations of the manual mode, the semi-manual mode, and the autonomous mode.

15. The method of claim 14, further comprises:
receiving, at the data processing hardware, the selection of the semi-manual mode;
transmitting, from the data processing hardware to the user interface, a command instructing the user interface to display a first maneuver to be taken by a driver of the tow vehicle to move the tow vehicle; and receiving, at the data processing hardware, a confirmation from the driver via the user interface, the confirmation indicative of the driver following the first maneuver.

16. The method of claim 14, further comprising:
receiving, at the data processing hardware, the selection of the autonomous mode; determining, at the data processing hardware, a vehicle path comprising one or more maneuvers; and
instructing a drive system in communication with the data processing hardware to follow the vehicle path.

17. The method of claim 10, further comprising, for each vehicle maneuver:
determining, at the data processing hardware, a current trailer angle; and
determining, at the data processing hardware, a current trailer representation position.

18. The method of claim 17, further comprising:
generating, at the data processing hardware, a mapping based on the current trailer angle and the current trailer representation, wherein for each trailer angle one current trailer representation position is available.

19. The method of claim 10, wherein each of the one or more virtual trailers has a trailer axle length which is different from a trailer axle length associated with the trailer.

20. The method of claim 10, wherein the one or more virtual trailers comprises a plurality of virtual trailers, and overlaying the one or more virtual trailers overlays the plurality of virtual trailers simultaneously.

21. A method for determining a trailer length of a trailer attached to a tow vehicle while the tow vehicle follows a path, the tow vehicle having one or more sensors positioned on a back portion of the tow vehicle facing the trailer, the method comprising:
receiving, at a data processing hardware in communication with the one or more sensors, first sensor data associated with a first position of the tow vehicle along the path;
receiving, at the data processing hardware, second sensor data associated with a second position of the tow vehicle along the path, the second position being different from the first position;
receiving, at the data processing hardware, third sensor data associated with a third position of the tow vehicle along the path, the third position being different from the first position and the second position;
determining, at the data processing hardware, a trailer length based on the first, second, and third sensor data;
transmitting from the data processing hardware to a user interface in communication with the data processing hardware, instructions to display the trailer length,
wherein the one or more sensors comprises at least one of at least one camera, at least one LIDAR sensor, at least one LADAR sensor, at least one radar sensor, or at least one sonar sensor;
transmitting, from the data processing hardware to a user interface in communication with the data processing hardware, a command instructing the user interface to display a representation of a manual mode, a representation of a semi-manual mode, and a representation of an autonomous mode; and
receiving, at the data processing hardware from the user interface, a selection of one of the representations of the manual mode, the semi-manual mode, and the autonomous mode;
receiving, at the data processing hardware, the selection of the semi-manual mode;

before receiving the first sensor data associated with the first position of the tow vehicle:
- transmitting, from the data processing hardware to the user interface, a command instructing the user interface to display a first maneuver to be taken by a driver of the tow vehicle to move the tow vehicle from an initial position to the first position, the first maneuver comprising turning front wheels of the tow vehicle in a first direction and moving the tow vehicle in a reverse direction;
- receiving, at the data processing hardware, a confirmation from the driver via the user interface, the confirmation indicative of the driver following the first maneuver;
- transmitting, from the data processing hardware to the user interface, a command instructing the user interface to display a second maneuver to be taken by the driver to move the tow vehicle from the first position to the second position, the second maneuver comprising turning the front wheels of the tow vehicle in a second direction opposite to the first direction and moving the tow vehicle from the first position to the second position in the reverse direction or in a forward direction; and
- receiving, at the data processing hardware, a confirmation from the driver via the user interface, the confirmation indicative of the driver following the second maneuver.

* * * * *